(12) United States Patent
Yoshida

(10) Patent No.: US 7,577,748 B2
(45) Date of Patent: Aug. 18, 2009

(54) INFORMATION DEVICE AND CONTROLLING METHOD OF THE SAME

(75) Inventor: Kenji Yoshida, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 835 days.

(21) Appl. No.: 11/062,746

(22) Filed: Feb. 23, 2005

(65) Prior Publication Data

US 2005/0198358 A1    Sep. 8, 2005

(30) Foreign Application Priority Data

| Feb. 23, 2004 | (JP) | ............................. 2004-046160 |
| Jul. 12, 2004 | (JP) | ............................. 2004-204312 |
| Feb. 8, 2005 | (JP) | ............................. 2005-031973 |

(51) Int. Cl.
G06F 15/16       (2006.01)

(52) U.S. Cl. ........................ 709/230; 709/203; 709/232

(58) Field of Classification Search .................. 709/230, 709/203, 232
See application file for complete search history.

(56) References Cited

U.S. PATENT DOCUMENTS

| 5,566,077 | A | * | 10/1996 | Kulakowski et al. ........ 700/299 |
| 6,058,440 | A | | 5/2000 | Bloch et al. |
| 6,483,805 | B1 | * | 11/2002 | Davies et al. ............... 370/235 |
| 6,636,910 | B2 | * | 10/2003 | Kung et al. .................... 710/60 |
| 6,647,320 | B1 | * | 11/2003 | Inoue .......................... 700/300 |
| 6,876,639 | B1 | * | 4/2005 | Cao ............................. 370/331 |
| 7,016,971 | B1 | * | 3/2006 | Recio et al. .................. 709/233 |
| 7,234,067 | B2 | * | 6/2007 | Burton ........................ 713/320 |
| 2002/0085587 | A1 | * | 7/2002 | Mascolo ...................... 370/477 |
| 2002/0099854 | A1 | * | 7/2002 | Jorgensen .................... 709/249 |
| 2002/0103943 | A1 | * | 8/2002 | Lo et al. .......................... 710/2 |
| 2003/0031203 | A1 | * | 2/2003 | Fukui .......................... 370/469 |
| 2003/0135767 | A1 | * | 7/2003 | Chu et al. .................... 713/300 |
| 2003/0137938 | A1 | * | 7/2003 | Belanger et al. ............ 370/230 |
| 2003/0191889 | A1 | | 10/2003 | Forrer, Jr. |
| 2003/0202520 | A1 | * | 10/2003 | Witkowski et al. .......... 370/400 |
| 2004/0019738 | A1 | * | 1/2004 | Kahn et al. ................. 711/104 |
| 2006/0075509 | A1 | * | 4/2006 | Kishon ........................ 726/34 |

FOREIGN PATENT DOCUMENTS

| JP | 2000-20253 A | 1/2000 |
| WO | WO 02/25448 A2 | 3/2002 |

OTHER PUBLICATIONS

Jacobson, Van et al. Congestion Avoidane and Control. Aug./Nov. 1988. Proceedings of SIGCOMM '88. pp. 1-25.*
Compaq, Hewlet-Packard, Intel, Lucent, Microsoft, NEC, Philips: Universal Serial Bus Specification Revision 2.0 'Online! Apr. 27, 2000, pp. 206-232, XP002335762.

* cited by examiner

*Primary Examiner*—Salad Abdullahi
*Assistant Examiner*—Imad Hussain
(74) *Attorney, Agent, or Firm*—Sughrue Mion, PLLC

(57) ABSTRACT

An information device disclosed herein includes a communicator which communicates with a host, wherein, in a heat release mode, the communicator transmits a reply that the data has not been properly received to the host at a given ratio even when the data has been properly received; a heat-producing internal unit which operates according to the data received by the communicator, the heat-producing unit producing heat by operating continuously; a temperature detector which detects a temperature of the internal unit; and a first mode changer which changes the communicator from a normal mode to the heat release mode when the temperature detected by the temperature detector is a first set value or higher.

18 Claims, 24 Drawing Sheets

DETAILS OF ACCESS CODE

DETAILS OF HEADER

DETAILS OF PAYLOAD

TB10 : NAK RATIO TABLE

| TIME UNTIL TIMEOUT | NAK RATIO |
| --- | --- |
| 100ms OR LESS | 50% |
| 100ms ~ 199ms | 60% |
| 200ms ~ 299ms | 70% |
| 300ms ~ 399ms | 80% |
| 400ms OR MORE | 90% |

INFORMATION DEVICE AND CONTROLLING METHOD OF THE SAME

CROSS REFERENCE TO RELATED APPLICATION

This application claims benefit of priority under 35 U.S.C. §119 to Japanese patent applications No. 2004-46160, filed on Feb. 23, 2004, No. 2004-204312, filed on Jul. 12, 2004, and No. 2005-31973, filed on Feb. 8, 2005, the entire contents of which are incorporated by reference herein.

BACKGROUND OF THE INVENTION

1. Field of the Invention

The present invention relates to an information device and a controlling method of the same, and particularly relates to an information device including a heat-producing internal unit which produces heat by operating continuously and a controlling method of the same.

2. Related Background Art

In recent years, multimedia information devices represented by a digital video camera and a digital still camera have become rapidly widespread. Accordingly, between a computer and an information device (especially a portable device) having a storage function (information storing/recording function), not only normal data files but also so-called multimedia file data including video data, image data, music data is frequently exchanged.

The capacity of a multimedia file (especially image data) is generally a large capacity although it varies according to factors such as a file format, compression ratio, and recording time. High-speed serial interfaces such as an IEEE 1394 bus and a universal serial bus (hereinafter referred to USB) have been increasingly used for transferring this multimedia file.

If data is exchanged between these computer and peripheral information device via the USB interface or the like, the temperature of a recording unit (hard disk, for example) of the information device increases due to long-time continuous access from the computer. Hence, the need for taking some measures in order that the temperature of the recording unit does not exceed a temperature prescribed by the information device itself arises.

Such temperature increase causes a notable problem especially in potable information devices including a notebook PC, a PDA (Personal Digital Assistant), and so on for the following reason.

Namely, exceeding the usable temperature range of the hard disk or the like may cause a malfunction, but since production merits of the portable information device are size reduction and weight reduction, it is difficult to take measures against heat release physically accompanied by weight increase and size increase of the product.

As for the portable information device, a user may manipulate it while holding its product body directly in his or her hand or while holding it on his or her lap, or carry it while holding it in a clothes pocket. At this time, if the temperature of the recording unit such as the hard disk inside the device becomes higher in his or her hand, on his or her lap, or in the pocket, the product body which the user can touch heats up, and this heat may cause the user discomfort.

To prevent the surface temperature of the product from increasing and exceeding a certain temperature, it is necessary to measure the ambient temperature of the hard disk or the like, and if the temperature approaches a set vale, to take appropriate measures to decrease the temperature.

In the recording unit such as the hard disk, similarly to other electronic components, modules, and units, the rated temperature is determined by its own usable temperature (which includes operation guaranteed temperature, performance guaranteed temperature, surrounding environment temperature) range specification, and therefore it is necessary to set a threshold of the detected temperature by considering performance variations of respective products in addition to the value of the rated temperature and adding a margin.

Incidentally, Japanese Patent Application Laid-open No. 2000-20253 (hereinafter referred to Patent Document 1) discloses an image recording device which performs temperature control to prevent image degradation accompanying temperature increase of a recording head. This image recording device is connected to the computer not by a USB but by an IEEE1394 bus, and the object whose temperature is to be decreased is limited to the recording head of the image recording device.

The following measures are generally taken in order to decrease the temperature as described above.

(1) A physical measure in which a large radiator or cooling fan is mounted or a vent hole is provided in a component or a unit which produces heat.

(2) A measures in which the temperature increase of an information device is reported to a computer as a data transmitter by communication exchange between the computer and the information device via the USB to suppress access.

However, the measure in (1) causes a physical increase in the size of a casing and an increase in noise due to the fan. Also this causes cost increase because of additional components or an increase in the number of man hours for mounting.

Moreover, as concerns the measure in (2), the USB interface is a standard specification having a master-slave relationship in which a computer as a host is a master and an information device as a device is a slave. The host as the master manages communication with the information device, and the communication is first started by the host and progresses by the device giving a reply to the host.

Therefore, in order that the host knows the temperature of the device and performs some control, for example, processing of making a request to confirm and transmit temperature data inside the device from the host to the device, analyzing the data transmitted from the device, and performing processing to reduce the amount of transmit data when it is necessary to decrease the temperature becomes necessary. However, to realize this, the host also needs driver software of its own.

The production of the software and incorporation thereof into the host device cause many harmful effects such as problems of a period and a cost required for development, a cost required for driver distribution, an installation work of a manufacturer or a user, and the operation guarantee of each computer.

Unless the processing of incorporating the software of its own into the host is performed, the surface temperature of the target unit in the information device approaches an upper limit of the usable temperature, and even if there is a possibility that the surface temperature exceeds the upper limit, this cannot be reported from the information device as the slave to the computer as the master. Accordingly, in a communication interface with such a master-slave relationship, it is desired that access to the heat-producing internal unit such as the hard disk be able to be stopped by a simple method. Moreover, also in a communication device without a master-slave relationship, it is convenient that the access to the heat-producing internal unit such as the hard disk can be stopped by the simple method.

SUMMARY OF THE INVENTION

Hence, the present invention is made in view of the aforementioned problems, and it is an object of the present invention that when the temperature of a heat-producing internal unit provided in an information device which communicates with a host increases, access to this internal unit can be virtually stopped by a simple method.

In order to accomplish the aforementioned and other objects, according to one aspect of the present invention, an information device, comprises:

a communicator which communicates with a host, wherein, in a normal mode, the communicator transmits a reply that data has been properly received to the host when the data has been properly received and transmits a reply that the data has not been properly received to the host when the data has not been properly received, and wherein, in a heat release mode, the communicator transmits the reply that the data has not been properly received to the host at a given ratio even when the data has been properly received;

a heat-producing internal unit which operates according to the data received by the communicator, the heat-producing unit producing heat by operating continuously;

a temperature detector which detects a temperature of the internal unit; and a first mode changer which changes the communicator from the normal mode to the heat release mode when the temperature detected by the temperature detector is a first set value or higher.

According to another aspect of the present invention, a controlling method of an information device which operates according to received data and which includes a heat-producing internal unit producing heat by operating continuously, comprises the steps of:

in a communication with a host, transmitting a reply that data has been properly received to the host when the data has been properly received in a normal mode and transmitting a reply that the data has not been properly received to the host when the data has not been properly received in the normal mode;

in the communication with the host, transmitting the reply that the data has not been properly received to the host at a given ratio even when the data has been properly received in a heat release mode;

detecting a temperature of the internal unit; and changing a communication mode from the normal mode to the heat release mode when the detected temperature is a first set value or higher.

According to another aspect of the present invention, a recording medium has a program for controlling an information device which operates according to received data and which includes a heat-producing internal unit producing heat by operating continuously recorded thereon, wherein the program causes the information device to execute process comprising the steps of:

in a communication with a host, transmitting a reply that data has been properly received to the host when the data has been properly received in a normal mode and transmitting a reply that the data has not been properly received to the host when the data has not been properly received in the normal mode;

in the communication with the host, transmitting the reply that the data has not been properly received to the host at a given ratio even when the data has been properly received in a heat release mode;

detecting a temperature of the internal unit; and changing a communication mode from the normal mode to the heat release mode when the detected temperature is a first set value or higher.

According to another aspect of the present invention, an information device, comprises:

a communicator which communicates with a host, wherein, in a normal mode, the communicator transmits a reply that data has been properly received to the host when the data has been properly received and does not transmit the reply that the data has been properly received to the host when the data has not been properly received, and wherein, in a heat release mode, the communicator does not transmit the reply that the data has been properly received to the host at a given ratio even when the data has been properly received;

a heat-producing internal unit which operates according to the data received by the communicator, the heat-producing unit producing heat by operating continuously;

a temperature detector which detects a temperature of the internal unit; and a first mode changer which changes the communicator from the normal mode to the heat release mode when the temperature detected by the temperature detector is a first set value or higher.

According to another aspect of the present invention, a controlling method of an information device which operates according to received data and which includes a heat-producing internal unit producing heat by operating continuously, comprises the steps of:

in a communication with a host, transmitting a reply that data has been properly received to the host when the data has been properly received in a normal mode and not transmitting the reply that the data has been properly received to the host when the data has not been properly received in the normal mode;

in the communication with the host, not transmitting the reply that the data has been properly received to the host at a given ratio even when the data has been properly received in a heat release mode;

detecting a temperature of the internal unit; and changing a communication mode from the normal mode to the heat release mode when the detected temperature is a first set value or higher.

According to another aspect of the present invention, a recording medium has a program for controlling an information device which operates according to received data and which includes a heat-producing internal unit producing heat by operating continuously recorded thereon, wherein the program causes the information device to execute process comprising the steps of:

in a communication with a host, transmitting a reply that data has been properly received to the host when the data has been properly received in a normal mode and not transmitting the reply that the data has been properly received to the host when the data has not been properly received in the normal mode;

in the communication with the host, not transmitting the reply that the data has been properly received to the host at a given ratio even when the data has been properly received in a heat release mode;

detecting a temperature of the internal unit; and changing a communication mode from the normal mode to the heat release mode when the detected temperature is a first set value or higher.

DETAILED DESCRIPTION OF THE EMBODIMENTS

First Embodiment

First, an outline of an information processing system according to the first embodiment will be given. In this first embodiment, a computer as a host and an information device including a hard disk drive are connected via a USB interface. In a standard specification defined by the USB interface, actual data exchange is performed by bulk transfer in a mass storage class device to which the information device including the hard disk drive belongs.

In the bulk transfer, when the information device has not properly received data, it transmits a "NAK" (negative acknowledgement) as a handshake packet to the computer. The computer which has received this "NAK" retries transmission of data repeatedly until receiving an "ACK" (acknowledgement) which means that data has been properly received or until receiving data which it requested.

In this embodiment, as applied to the specification, the information device continues transmitting the "NAK" at a given ratio (a given ratio from more than 0% to not more than 100%) when the temperature of the information device itself increases or the temperature of the hard disk drive increases. In so doing, the computer continues transmitting the same data until receiving the "ACK" or receiving data which it requested.

Since the number of accesses to the hard disk drive of the information device extremely reduces during this processing, the surface temperature of the hard disk drive decreases with time. Hence, the surface temperature of the hard disk drive can be decreased to a set value. If this set value is set with some leeway for an upper limit of a usable temperature of the information device, a margin is provided correspondingly.

By so doing, even when the USB interface having a master-slave relationship is used between the computer and the information device, the temperature control of the information device can be realized by making a change in firmware or the like in the information device without making any new software change in the computer. Namely, by giving feedback so that the temperature of the information device is maintained at the set value or lower, the temperature of the information device can be controlled.

Moreover, when the temperature of the information device is about to exceed the set value, data transmission from the computer is repeated until the temperature decreases, whereby proper data transmission is ensured. A more detailed explanation will be given below.

Figure 1:
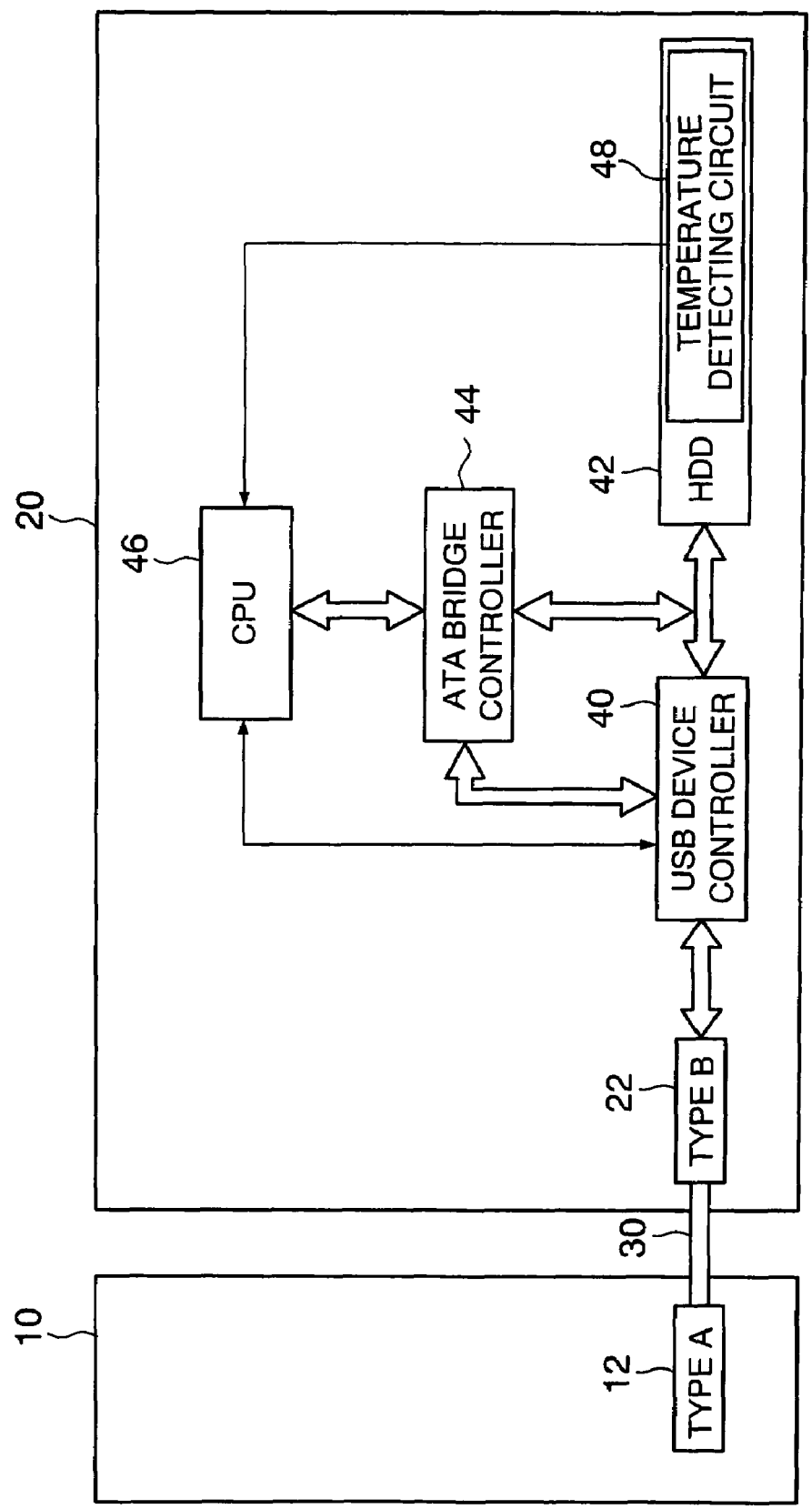
FIG. 1 is a block diagram showing the configuration of an information processing system according to a first embodiment.

FIG. 1 is a block diagram showing the configuration of the information processing system according to this embodiment. As shown in FIG. 1, the information processing system in this embodiment includes a computer 10 as a host and a storage device 20 as an information device. These computer 10 and storage device 20 are connected via a USB interface.

Namely, the computer 10 is provided with a connection port 12 of a type A, and the storage device 20 is provided with a connection port 22 of a type B. The connection port 12 of the computer 10 and the connection port 22 of the storage device 20 are connected by a USB cable 30.

The storage device 20 includes a USB device controller 40, a hard disk drive 42, an ATA bridge controller 44, and a CPU 46. The USB device controller 40 and the connection port 22 are connected by a data bus. The USB device controller 40 and the hard disk drive 42 as well as the USB device controller 40 and the ATA bridge controller 44 are also connected by a data bus. The ATA bridge controller 44 and the CPU 46 are also connected by a data bus.

The USB device controller 40 controls data exchange between the computer 10 and the storage device 20 based on the USB interface. Data is exchanged among the USB device controller 40, the hard disk drive 42, and the ATA bridge controller 44 based on an ATA standard. The ATA bridge controller 44 not only converts data received based on the ATA standard into data based on a data standard for the CPU 46 and transmits it to the CPU 46, but also converts data from the CPU 46 into data based on the ATA standard and transmits it to the USB device controller 40 and the hard disk drive 42.

On the surface of the hard disk drive 42 in this embodiment, a temperature detecting circuit 48 for detecting the temperature of the hard disk drive 42 is provided. Examples of this temperature detecting circuit 48 are a circuit which uses a thermistor, a circuit which utilizes the temperature dependency of the forward voltage of a diode, a circuit which realizes the temperature dependency of the base-emitter voltage of a transistor, and the like.

In the USB interface, device classes are defined. Usually, in the USB interface, in the case of a recording device such as the storage device 20, a class called a mass storage class is used. The mass storage class contains disk drives such as a flexible disk drive, a hard disk drive, and an optical disk drive. Moreover, in the USB interface, four types of data transfers are provided: control transfer, isochronous transfer, interrupt transfer, and a bulk transfer.

In a mass storage class device to which a recording unit such as a hard disk drive belongs to, actual data exchange is performed by bulk transfer. The bulk transfer is used in the case of transfer of a large amount of data whose delay is not important with a high degree of reliability out of aperiodic transfer such as the transmission of a file to a printer or the reading from or writing to a disk. In this bulk transfer, processing has to be waited for while a bus is used by isochronous transfer or interrupt transfer, and transfer is performed when the bus becomes vacant. Therefor, the transfer rate of data is not guaranteed. Instead, all of a period of time when the bus is vacant can be used, which produces an advantage that when the bus is vacant, data can be transferred at a very high speed. Moreover, in this bulk transfer, when the host receives the "NAK" from the device, it reties data transfer repeatedly until receiving the "ACK".

Figure 2:
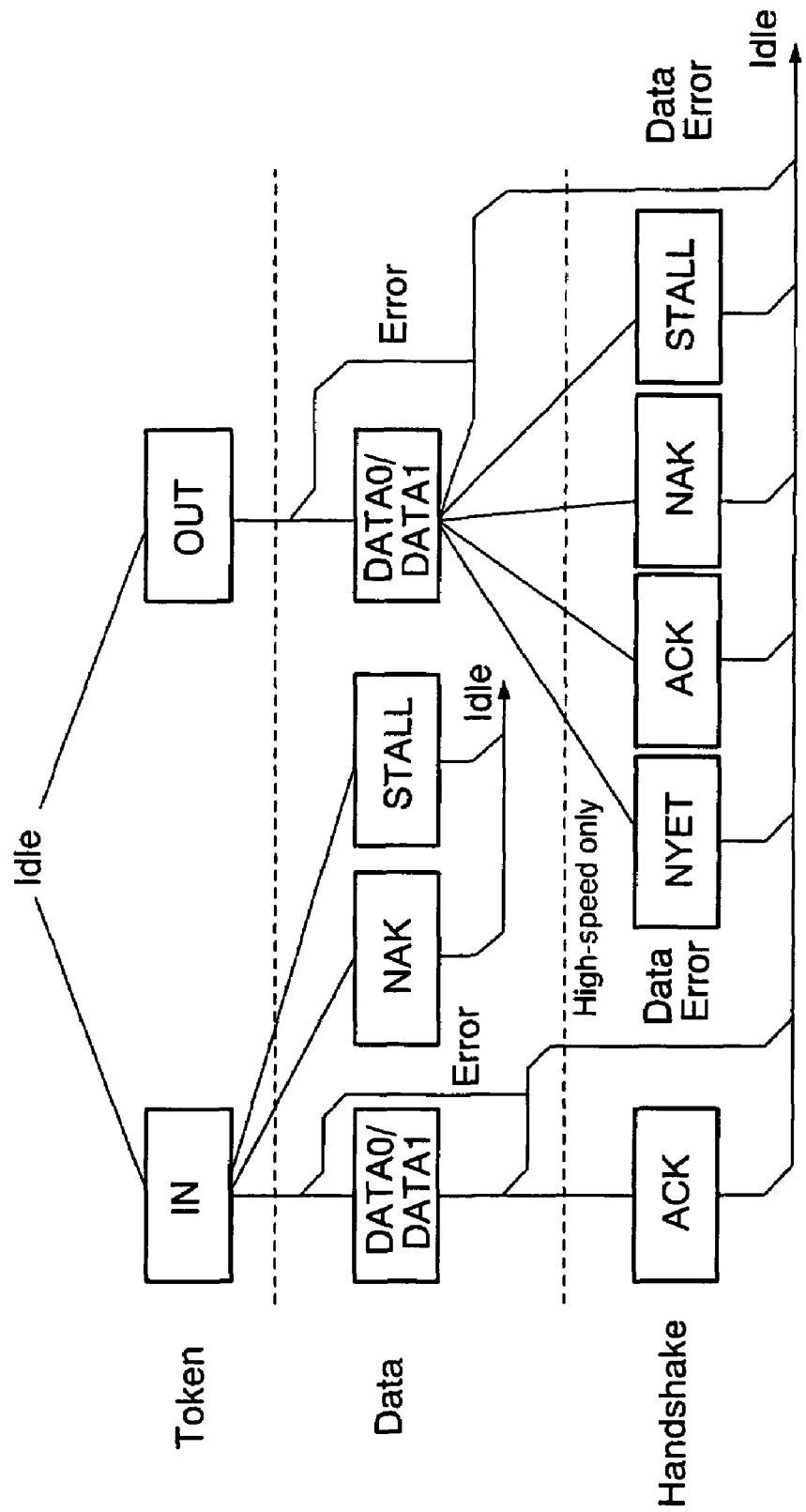
FIG. 2 is a diagram showing transactions in bulk transfer through a USB interface.

Transactions in the USB bulk transfer are as shown in FIG. 2. As can be seen from FIG. 2, the bulk transfer is composed of three kinds of packets: a token packet, a data packet, and a handshake packet. As transactions, an IN transaction and an OUT transaction are provided. The IN transaction is a transaction in which data in the device is transmitted to the host. The OUT transaction is a transaction in which the device receives data transmitted from the host.

In the IN transaction, the device transmits data when being able to transmit the data in response to an IN token packet from the host, and transmits the "NAK" when being unable to transmit the data. Namely, the "NAK" means that the device does not have data to be transmitted or the device is not in a state where it can transmit data. When a request which the device does not support is made or when an end point is closed, the device transmits a "STALL".

In the OUT transaction, data is transmitted after an OUT token packet from the host, whereby the device transmits the "ACK", the "NAK", a "NYET" (not yet), or the "STALL" to show whether the device has been received this data. The "ACK" is transmitted when the device has properly received the data The "NAK" is transmitted when the device has not properly received the data. Namely, the "NAK" means that the device is busy. The "NYET" is transmitted when the data transmitted this time has been properly received but the next transmission needs to be made after a while. Namely, the transmission of the "NYET" means that the host is requested not to transmit data for a predetermined period of time. The "STALL" is transmitted when a request which the device does not support is made, when the end port is closed, and the like.

In the bulk transfer, in the OUT transaction, when the host has received the "NAK" from the device, the host retries data transfer until receiving the "ACK" from the device. In the IN transaction, when the host has received the "NAK" from the device, the host retransmits the IN token packet until receiving the data which the host requested from the device.

In this embodiment, by utilizing the aforementioned USB standard specification, the "NAK" is transmitted from the device to the host when the temperature of the device exceeds the set value in data communication by bulk transfer between the host and the device. Namely, in the IN transaction, the device transmits the "NAK" instead of transmitting data in response to the IN token packet from the host. In the OUT transaction, the device receives data after the OUT token packet from the host, but even when the data has been properly received, the device transmits "NAK". This processing makes it possible to reduce the number of accesses to a recording unit such as the hard disk drive of the device and thereby cool the increased device temperature.

When the temperature becomes somewhat lower than the set value, the device transmits requested data in response to the IN token packet in the IN transaction, whereas the device transmits the "ACK" in response to data retransmitted from the host to thereby resume proper data transfer.

Figure 3:
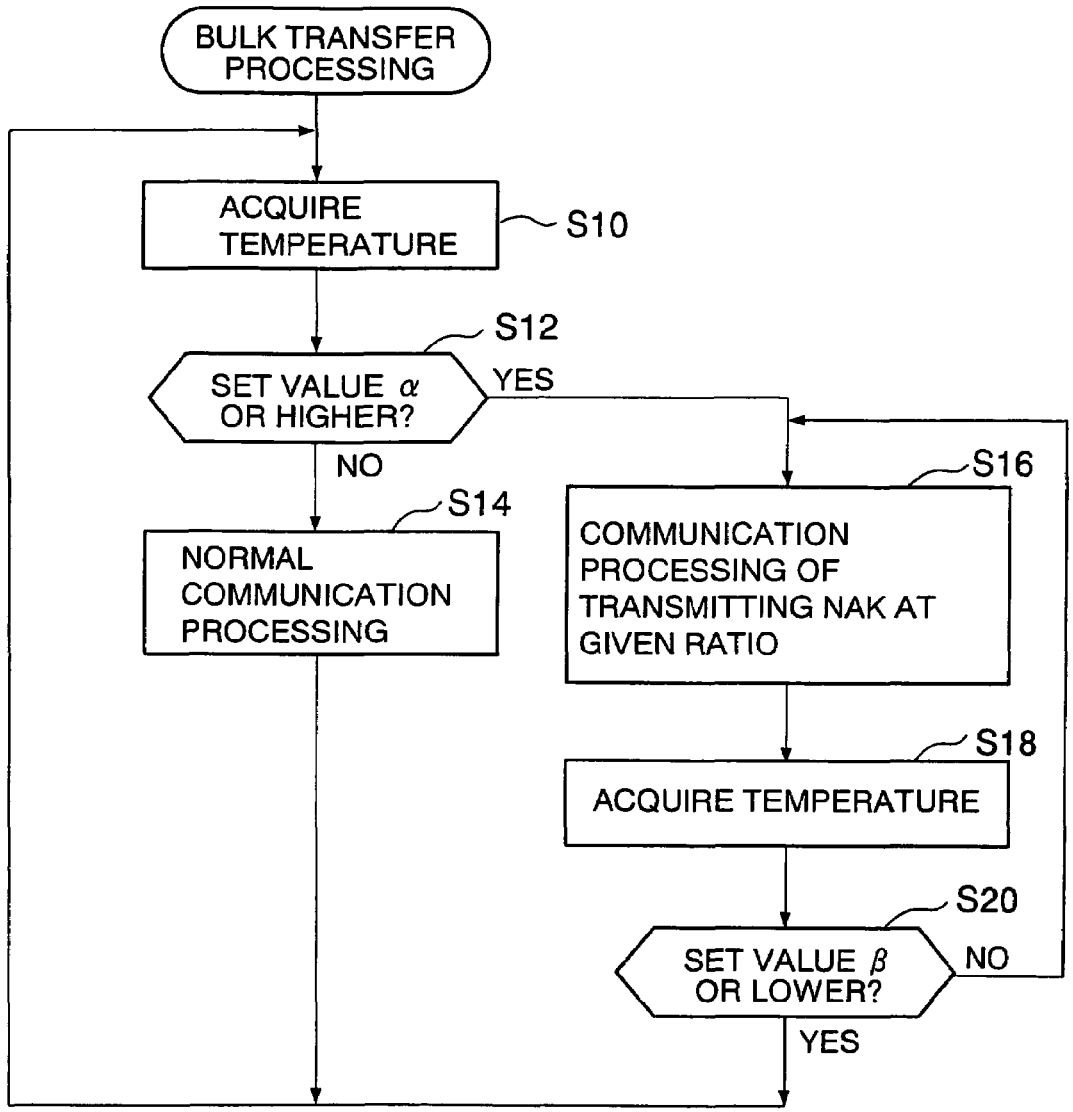
FIG. 3 is a flowchart explaining the contents of bulk transfer processing according to the first embodiment.
Figure 4:
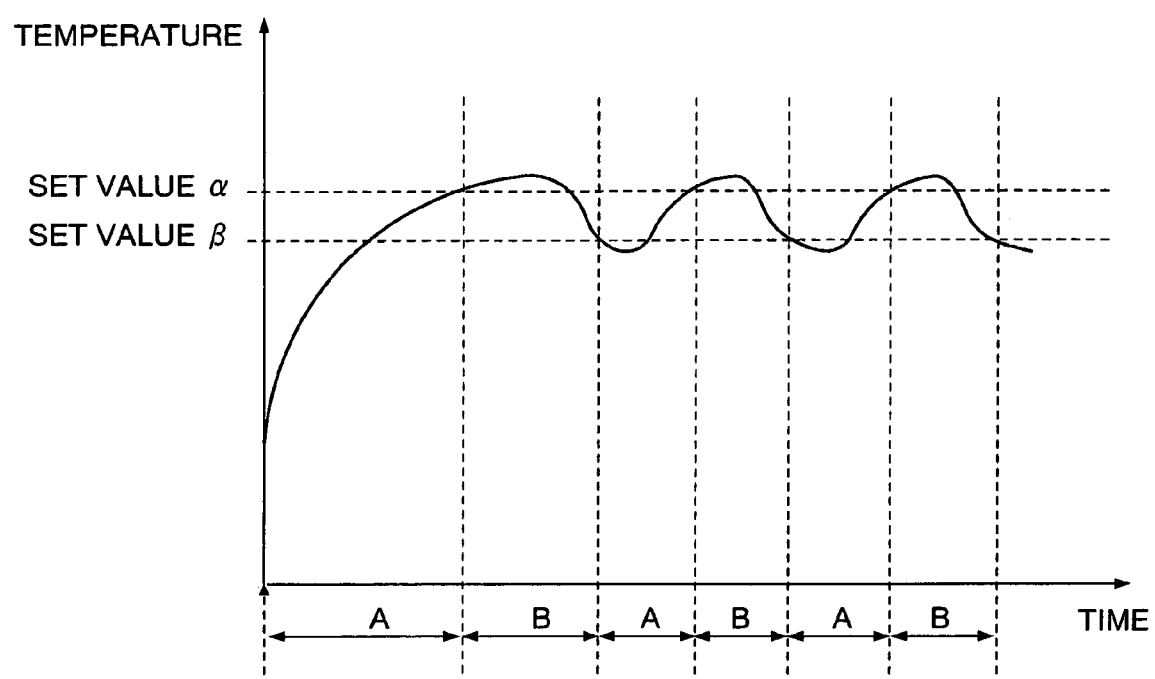
FIG. 4 is a graph showing an example of the temperature change of a hard disk drive during the bulk transfer according to the first embodiment.

This processing will be explained in detail using FIG. 3 and FIG. 4. FIG. 3 is a flowchart explaining the contents of bulk transfer processing according to this embodiment. The bulk transfer processing shown in FIG. 3 is constantly executed in the CPU 46. FIG. 4 is a graph showing an example of temperature change in the hard disk drive 42 while the bulk transfer processing according to this embodiment is performed.

As shown in FIG. 3, the storage device 20 as the device acquires a temperature of the hard disk drive 42 from the temperature detecting circuit 48 when the bulk transfer processing is started (step S10). Subsequently, the storage device 20 judges whether the temperature of the hard disk drive 42 is a set value α or higher (step S21). In this embodiment, for example, the usable temperature of the hard disk drive 42 is 60° C. or lower, and hence the temperature of the set value α is 55° C.

When the temperature of the hard disk drive 42 is not the set value α or higher (step S12: NO), the storage device 20 performs normal communication processing (step S14). This normal communication processing corresponds to a period A in FIG. 4 and corresponds to a normal mode in this embodiment. While the normal communication processing is performed, the storage device 20 acquires the temperature of the hard disk drive 42 in predetermined cycles (step S10) to continue checking whether the temperature of the hard disk drive 42 reaches the set value α or higher (step S12). This normal communication processing is autonomously performed by the USB device controller 40 by the CPU 46 instructing the USB device controller 40 to perform the normal communication processing. Hence, data received by the USB device controller 40 from the computer 10 is stored in the hard disk drive 42, whereas data read from the hard disk drive 42 is transmitted to the computer 10.

On the other hand, when the temperature of the hard disk drive 42 is the set value α or higher (step S12: YES), the storage device 20 performs communication processing of transmitting the "NAK" at a given ratio (step S16). Namely, when receiving token packets and data from the computer 10 as the host, the storage device 20 transmits the "NAK" to the computer 10 at the given ratio. This communication processing of transmitting the "NAK" at the given ratio corresponds to a period B in FIG. 4 and corresponds to a heat release mode in this embodiment.

To realize the communication processing of transmitting the "NAK" at the given ratio, the CPU 46 instructs the USB device controller 40 to perform the communication processing of transmitting the "NAK" at the given ratio.

Figure 5:
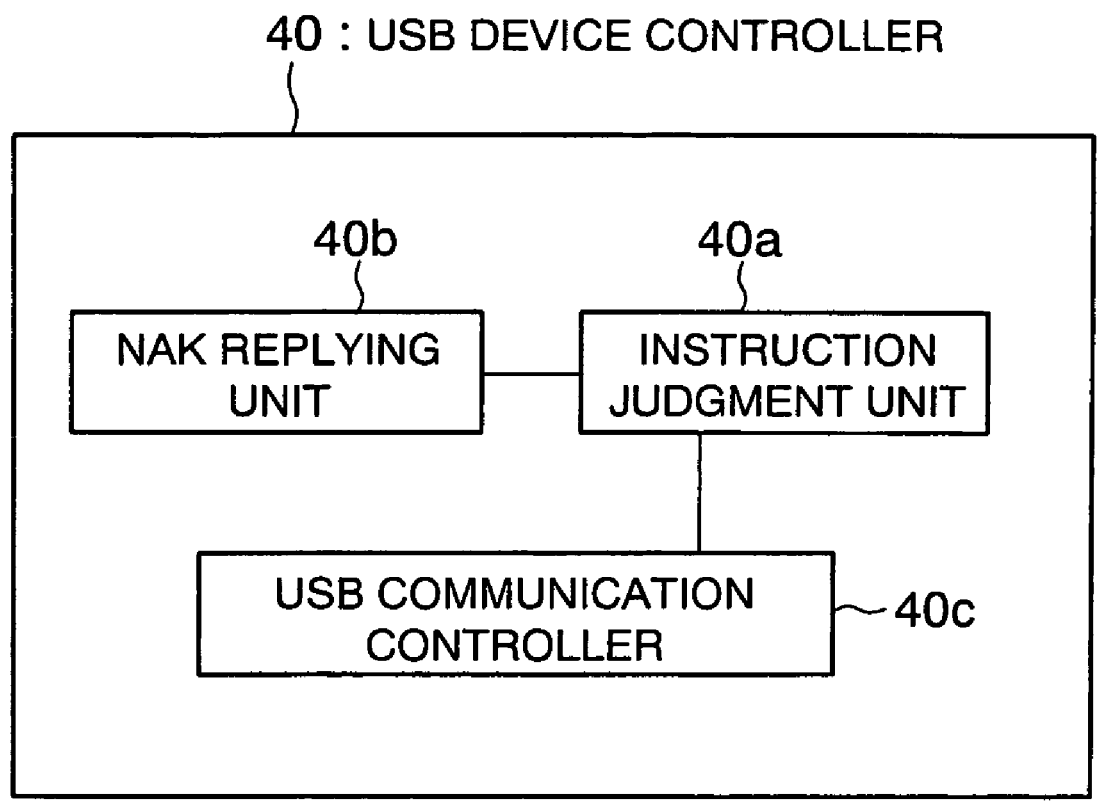
FIG. 5 is a block diagram explaining an example of an internal structure of a USB device controller according to the first embodiment.

FIG. 5 is diagram explaining an example of an internal structure of the USB device controller according to this embodiment. As shown in FIG. 5, the USB device controller 40 includes an instruction judgment unit 40a, a NAK replying unit 40b and a USB communication controller 40c.

The instruction judgment unit 40a judges whether the instructions from the CPU 46 instruct the USB device controller 40 to transmit "NAK" at the given ratio or to execute the normal USB communication. The NAK replying unit 40b executes the communication processing to transmit "NAK" at the given ratio in accordance with the instructions from the instruction judgment unit 40a. On the other hand, the USB communication controller 40c executes the normal USB communication processing in accordance with the instructions from the instruction judgment unit 40a.

Therefore, in the USB device controller 40 which has received the instructions which instruct the USB device controller 40 to transmit "NAK" at the given ratio in step S16, the NAK replying unit 40b transmits the "NAK" at the given ratio in response to the token packets and data transmitted from the computer 10. Namely, when the "NAK" is transmitted, the received data is abandoned without being stored in the hard disk drive 42. Further, a request to read data from the hard disk 42 is abandoned without being accepted.

The given ratio can be set variously, for example, at 100% (namely, the "NAK" is transmitted in all cases) or at 50%. By so doing, the number of accesses to the hard disk drive 42 can be reduced or reduced to zero, and consequently the temperature of the hard disk drive 42 can be decreased.

As described just above, the temperature of the hard disk drive 42 is acquired from the temperature detecting circuit 48 in the predetermined cycles while the communication processing of transmitting the "NAK" at the given ratio (step S18), and it is judged whether the acquired temperature is a set value β or lower (step S20). In this embodiment, this set value β is 50° C. Namely, a margin of 5° C. is provided for the set value α being 55° C.

When the temperature acquired in step S20 is not the set value β or lower (step S20: NO), the communication processing of transmitting the "NAK" at the given ratio is continued (step S16), and when the acquired temperature is the set value β or lower (step S20: YES), the processing returns to step S10, and the normal communication processing is performed. That is, the CPU 46 transmits to the USB device controller 40 the instructions which instruct the USB device controller 40 to execute the normal USB communication processing in step S14. In the USB device controller 40 which has received the instructions, the USB communication controller 40c executes the normal USB communication processing.

As stated above, according to the information processing system of this embodiment, when the temperature of the hard disk drive 42 of the storage device 20 reaches the set value α or higher, the number of accesses to the hard disk drive 42 from the computer 10 can be reduced or reduced to zero. Accordingly, the temperature of the hard disk drive 42 can be decreased. For example, as shown in FIG. 4, when the temperature of the hard disk drive 42 reaches the set value α or higher, the number of accesses to the hard disk drive 42 can be reduced or reduced to zero to thereby decrease the temperature of the hard disk drive 42.

When the temperature of the hard disk drive 42 decreases to the set value β or lower, the subsequent processing can be continued by accepting access to the hard disk drive 42 from the computer 10.

Moreover, in order to reduce the number of access to the hard disk drive 42 or reduce the number thereof to zero, the storage device 20 is only required to transmit the "NAK" to the computer 10, which makes it possible to realize this embodiment without adding special driver software to the computer 10 as the host. Namely, in a standard specification such as the USB interface in which communication cannot be made autonomously from the device, by utilizing the handshake packet to communicate the success or failure of data transmission/reception, a demand for rejecting access to the hard disk drive 42 in the device can be satisfied.

Further, the temperature control of the hard disk drive 42 in this embodiment can be realized by software, so that it is unnecessary to additionally mount a large cooler or cooling fan. Hence, the addition of a radiator and enlargement of case size by the provision of a vent hole which present problems especially in a portable information device can be avoided, and the occurrence of noise due to the fan can be also prevented.

Figure 6:
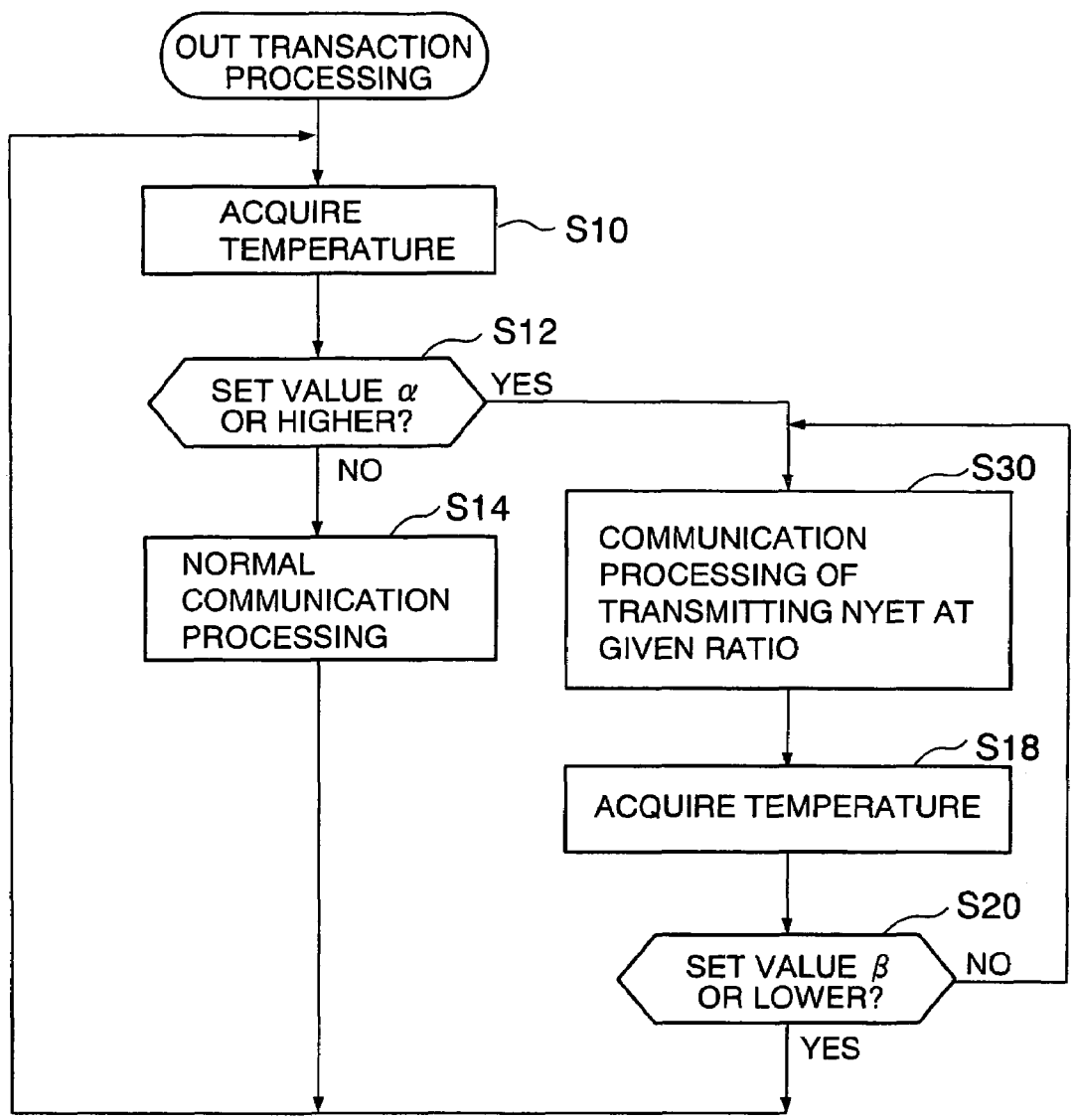
FIG. 6 is a flowchart explaining a modification of an OUT transaction processing in the bulk transfer.

It should be mentioned that this embodiment can be modified variously. For example, as can be seen from FIG. 6 and FIG. 2, as concerns the OUT transaction of the bulk transfer processing, in the aforementioned processing in step S16 in FIG. 3, the "NYET" may be transmitted in place of the "NAK" (step S30). This "NYET" is supported only by USB 2.0 high-speed transfer.

In this case, as for the IN transaction of the bulk transfer processing, the same processing as in FIG. 3 described above is performed. Furthermore, in the USB interface standard specification, the host to which the "NYET" has been transmitted from the device checks whether the device is busy using a "PING" before resuming data transmission.

Figure 7:
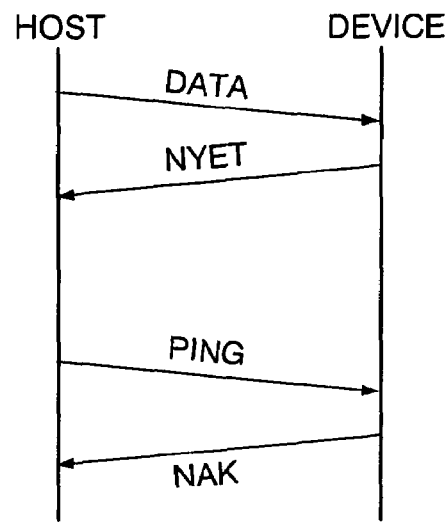
FIG. 7 is a diagram showing an example of exchanges between a host and a device when the OUT transaction processing in FIG. 6 is performed.
Figure 8:
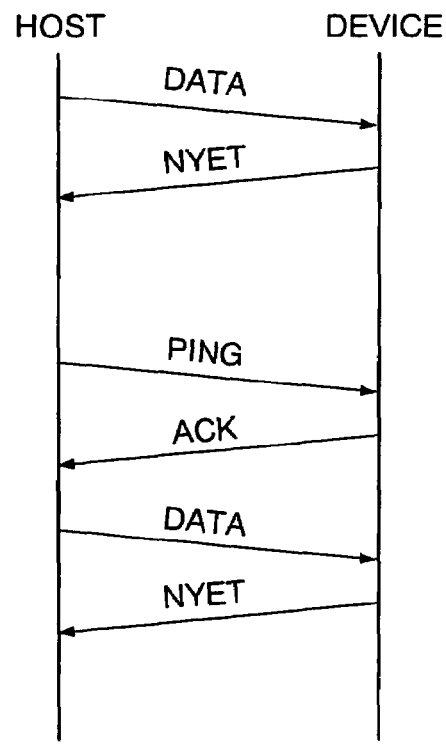
FIG. 8 is a diagram showing a modification of the exchanges between the host and the device when the OUT transaction processing in FIG. 6 is performed.

Namely, as shown in FIG. 7, the host which has received the "NYET" transmits the "PING" to the device after a predetermined period of time in order to check whether the device is busy, and in response thereto, the device transmits the status of the "ACK" or the "NAK". When the device is not ready yet, that is, when the temperature of the hard disk drive 42 does not reach the set value β or lower in this embodiment, the device transmits the "NAK". Alternatively, as shown in FIG. 8, it is also possible that when the temperature of the hard disk drive 42 does not reach the set value β or lower, the device temporarily transmits the "ACK" to the host in response to the "PING", and thereafter, upon receiving data, the device transmits the "NYET" to the host.

Second Embodiment

In the aforementioned first embodiment, the example in which the present invention is applied to the USB standard, but in the second embodiment, an example in which the present invention is applied to an IEEE1394 standard. It should be noted that in the second to fourth embodiments described below, only portions different from those in the first embodiment will be described.

In IEEE 1394, as transfer modes, there exist two kinds of transfer modes: isochronous transfer and asynchronous transfer. The isochronous transfer is a mode mainly used for transferring real-time data on image and voice, and bandwidth is guaranteed. The asynchronous transfer is a mode for transferring asynchronous data, and bandwidth is not guaranteed. In these two transfer modes, data acknowledgement is not made in the isochronous transfer, but data acknowledgement is made in the asynchronous transfer. At the time of acknowledgement, a data receiving end transmits an acknowledge packet when having properly received data from a transmitting end, whereas it transmits an acknowledge busy packet when not having properly received the data to request data retransmission. It is noted, however, that when having received a broadcast packet whose destination is not designated and which is addressed to all nodes, the receiving end does not transmit the acknowledge packet even if the data has been properly received.

Figure 9:
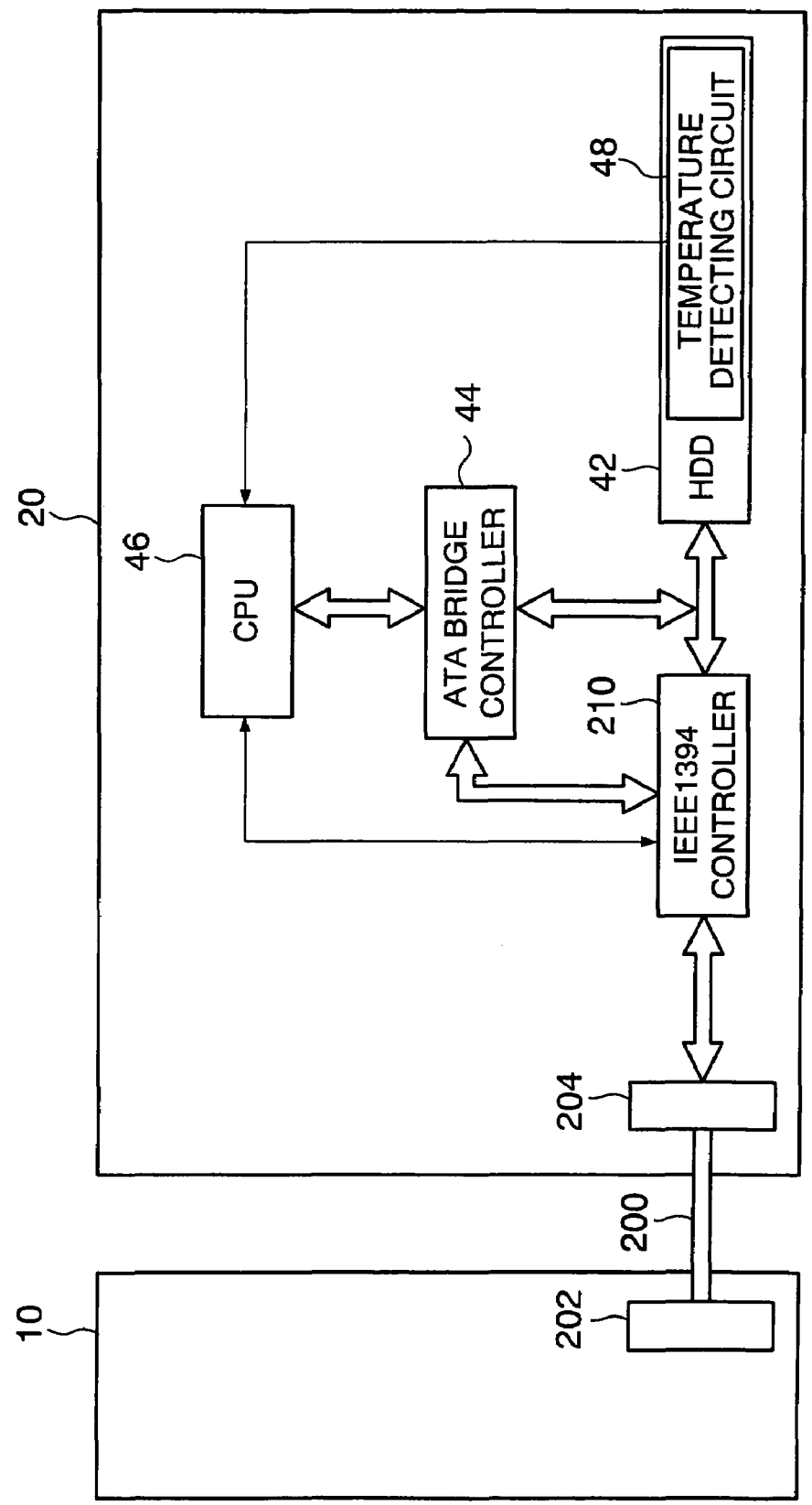
FIG. 9 is a block diagram showing the configuration of an information processing system according to a second embodiment.

FIG. 9 is a block diagram showing the configuration of an information processing system according to this embodiment and corresponds to FIG. 1 described above. FIG. 9 is different from FIG. 1 in that the computer 10 and the storage device 20 are connected by an IEEE1394 cable 200. Therefore, the computer 10 includes a connection port 202 which matches a connector of the IEEE1394 cable 200, and the storage device 20 includes a connection port 204 which matches a connector of the IEEE1394 cable 200. In addition, the storage device 20 has an IEEE1394 controller 210 instead of the USB device controller 40.

Figure 10:
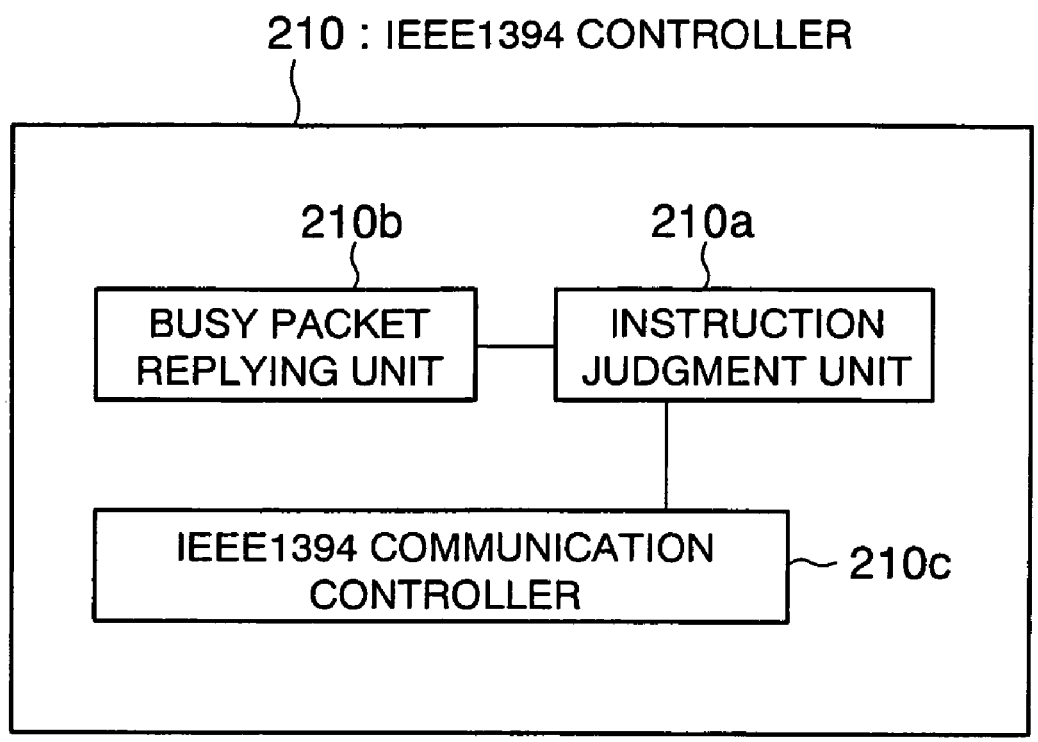
FIG. 10 is a block diagram explaining an example of an internal structure of an IEEE 1394 controller according to the second embodiment.

FIG. 10 is a block diagram explaining an example of an internal structure of the IEEE1394 controller 210, and corresponding to FIG. 5 mentioned above. As shown in FIG. 10, the IEEE1394 controller 210 includes an instruction judgment unit 210a, a busy packet replying unit 210b and an IEEE1394 communication controller 210c.

The instruction judgment unit 210a judges whether the instructions from the CPU 46 instruct the IEEE1394 controller 210 to reply the acknowledge busy packet at the given ratio or to execute the normal IEEE1394 communication. The busy packet replying unit 210b executes the communication processing that the acknowledge busy packet is replied in the given ratio in accordance with the instructions from the instruction judgment unit 210a. On the other hand, the IEEE1394 communication controller 210c executes the normal IEEE1394 communication processing in accordance with the instructions from the instruction judgment unit 210a.

Figure 11:
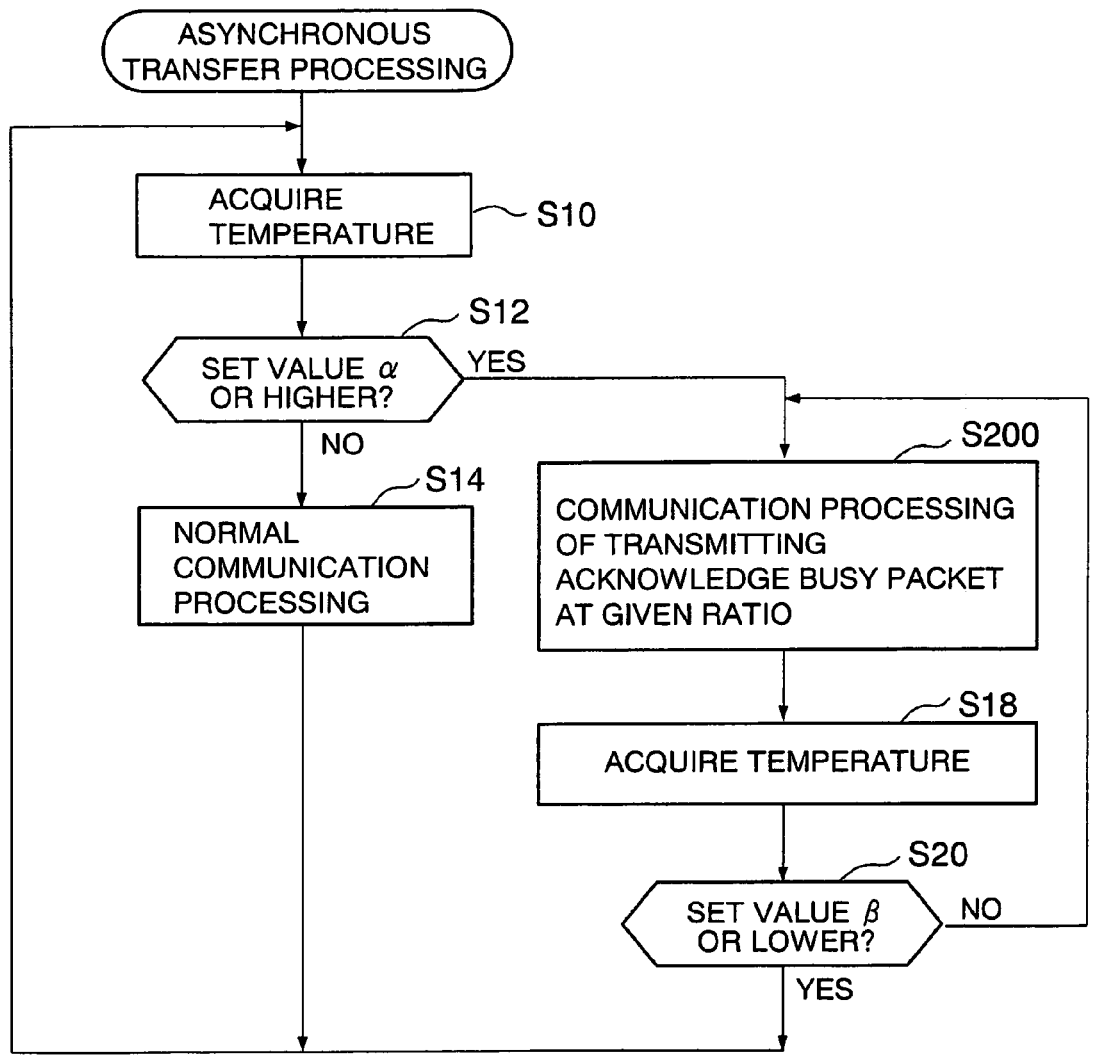
FIG. 11 is a flowchart explaining the contents of asynchronous transfer processing according to the second embodiment.

FIG. 11 is a flowchart explaining the contents of asynchronous transfer processing according to this embodiment, and corresponds to FIG. 3 described above. As can be seen from FIG. 11, in this embodiment, step S200 is performed instead of step S16. Namely, when the temperature of the hard disk drive 42 is the set value α or higher (step S12: YES), the storage device 20 performs communication processing of transmitting the acknowledge busy packet at a given ratio (step S200). Namely, even when data has been properly received when being received from the computer 10 as the host, the storage device 20 transmits the acknowledge busy packet to the computer 10 at the given ratio. As in the aforementioned first embodiment, the processing of transmitting the acknowledge busy packet at the given ratio is autonomously performed by the busy packet replying unit 210b of the IEEE1394 controller 210 based on instructions from the CPU 46. Then, when the temperature of the hard disk drive 42 reaches the set value β or lower, the CPU 46 instructs the IEEE1394 controller 210 to stop the processing of transmitting the acknowledge busy packet at the given ratio and return to the normal processing (step S20). In the IEEE1394 controller 210 which has received the instructions, the IEEE1394 communication controller 210c executes the normal IEEE1394 communication processing.

As described above, also according to the information processing system of this embodiment, when the temperature of the hard disk drive 42 of the storage device 20 reaches the set value α or higher, the number of accesses to the hard disk drive 42 from the computer 10 can be reduced or reduced to zero. Consequently, the temperature of the hard disk drive 42 can be decreased.

Third Embodiment

In the third embodiment, the present invention is applied to a Bluetooth standard. In Bluetooth, as communication links, an SCO link and an ACL link exist.

The SCO link is a circuit switched type and allows point-to-point communication between one master and one slave. It allows real-time transmission and it is mainly used for voice transmission and so on. In the SCO link, even if there is some error in a received packet, a data packet is not retransmitted. On the other hand, the ACL link is a packet exchanged type and allows point-to-multipoint communication between one master and plural slaves.

Data packets which are transmitted/received on the SCO link are generically called an SCO packet. The SCO packet does not have an error-detecting code in its payload. Data packets which are transmitted/received on the ACL link are generically called an ACL packet. The ACL packet has an error-detecting code in its payload and a retransmission function in principle. Additionally, a packet defined in common for both the SCO link and the ACL link is a common packet.

Figure 12A:
FIG. 12A is a diagram showing a packet format used in Bluetooth in a third embodiment.
Figure 12B:
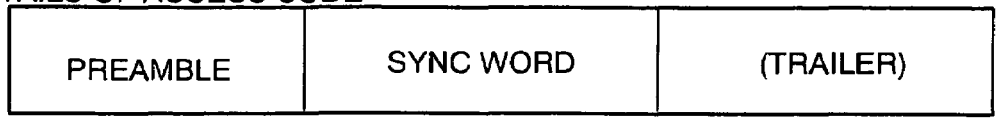
FIG. 12B is a diagram showing an access code format in detail.
Figure 12C:
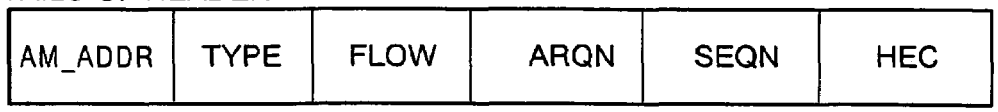
FIG. 12C is a diagram showing a header format in detail.
Figure 12D:
FIG. 12D is a diagram showing a payload format in detail.

FIG. 12A is a diagram showing a packet format used in the ACL link. As shown in FIG. 12A, each packet includes an access code, a header, and a payload as fields. As shown in FIG. 12B, the access code includes a preamble, a sync word, and a trailer as fields. As shown in FIG. 12C, the header includes AM_ADDR, TYPE, FLOW, ARQN, SEQN, and HEC as fields. As shown in FIG. 12D, the payload includes a payload header, a payload body, and CRC.

In Bluetooth, there is no packet for acknowledgement, and acknowledgement is performed by using the ARQN field, instead, a reception result is communicated to the transmitting end by transmitting ARQN=1 which means an acknowledgment when data has been properly received, and transmitting ARQN=0 which means a negative acknowledgement when the data has not been properly received. In the case of ARQN=0, the transmitting end which has received it retransmits the data.

Figure 13:
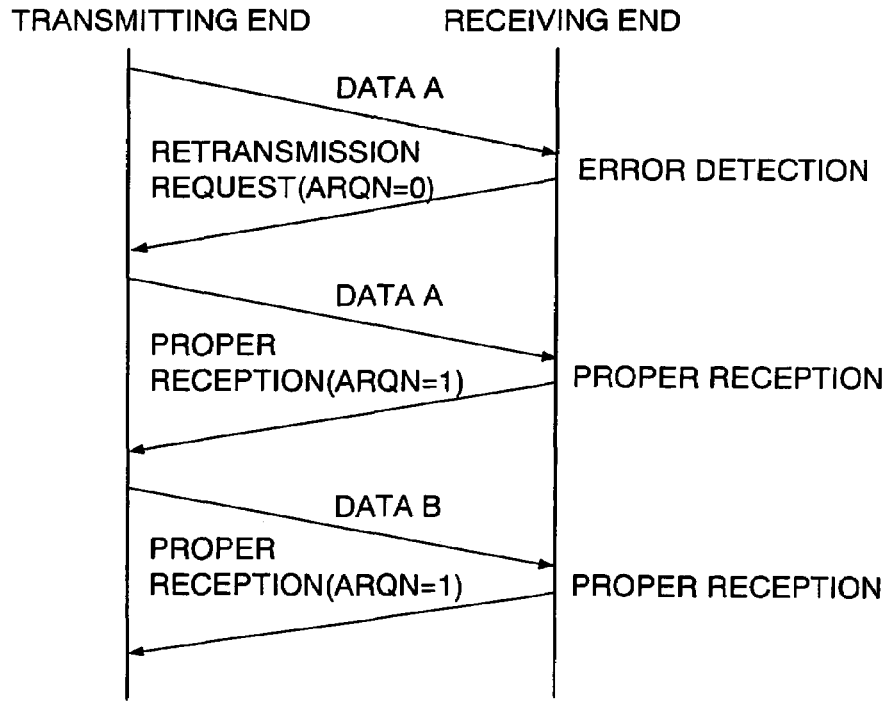
FIG. 13 is a diagram explaining a data transmission/reception flow in the third embodiment.

For example, as shown in FIG. 13, when not having properly received data A, the receiving end transmits ARQN=0 to the transmitting end to request retransmission. Upon receiving it, the transmitting end retransmits the data A. When having properly received the data A, the receiving end transmits ARQN=1 to the transmitting end to inform that the data A has been properly received. Upon receiving it, the transmitting end transmits next data B.

Moreover, in Bluetooth, a communication link monitoring timer is defined, and if retransmission is continued for more than a set value previously set by the communication link monitoring timer, a master regards a slave as non-communicable and disconnects the link.

Figure 14:
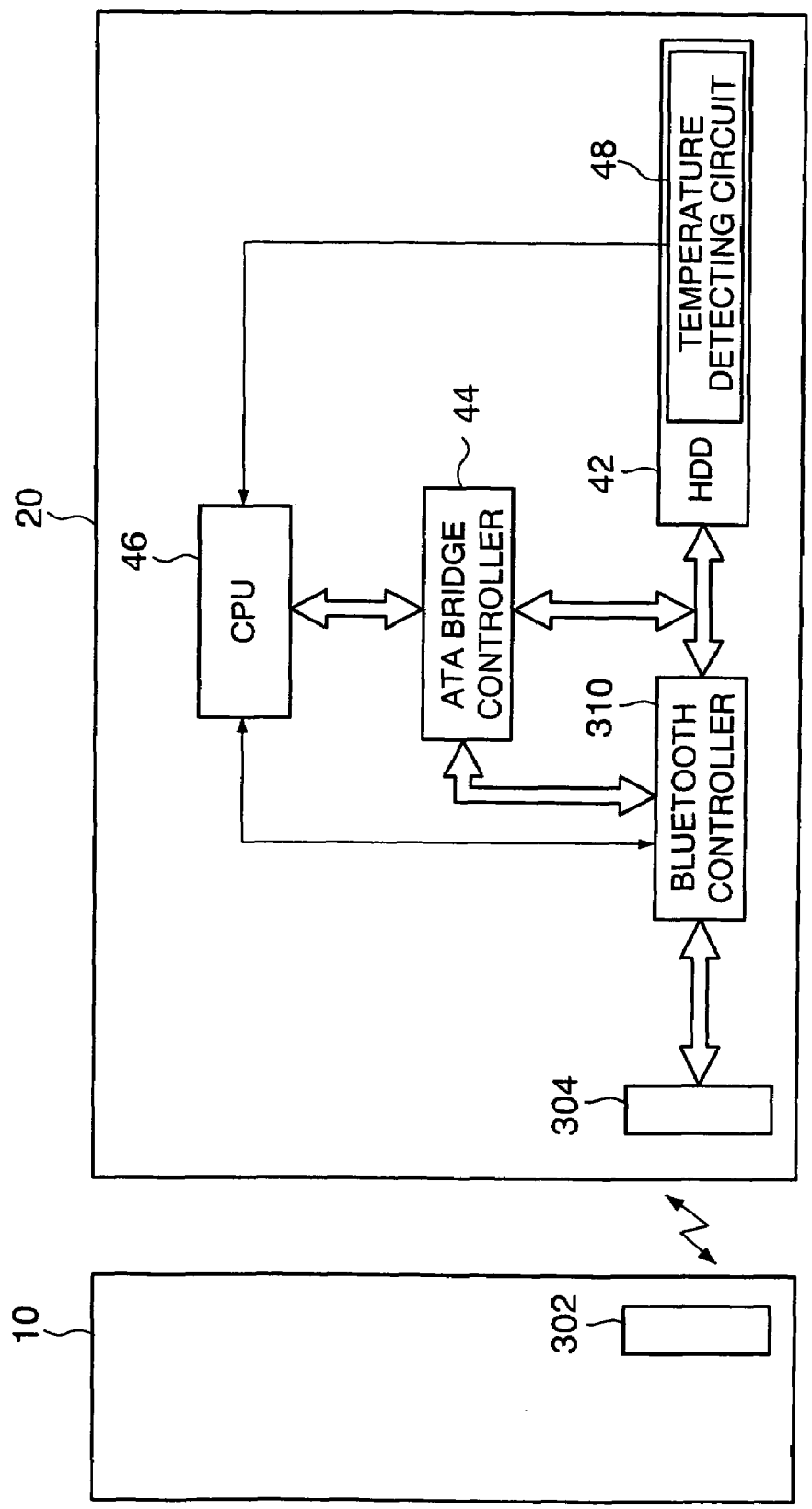
FIG. 14 is a block diagram showing the configuration of an information processing system according to the third embodiment.

FIG. 14 is a block diagram showing the configuration of an information processing system according to this embodiment, and corresponds to FIG. 1 described above. FIG. 14 is different from FIG. 1 in that the computer 10 and the storage device 20 are connected based on the Bluetooth standard, that is, wirelessly. Therefore, the computer 10 includes a transmitting/receiving unit 302 which complies with the Bluetooth standard, and the storage device 20 includes a transmitting/receiving unit 304 which complies with the Bluetooth standard. In addition, the storage device 20 has a Bluetooth controller 310 instead of the USB device controller 40.

Figure 15:
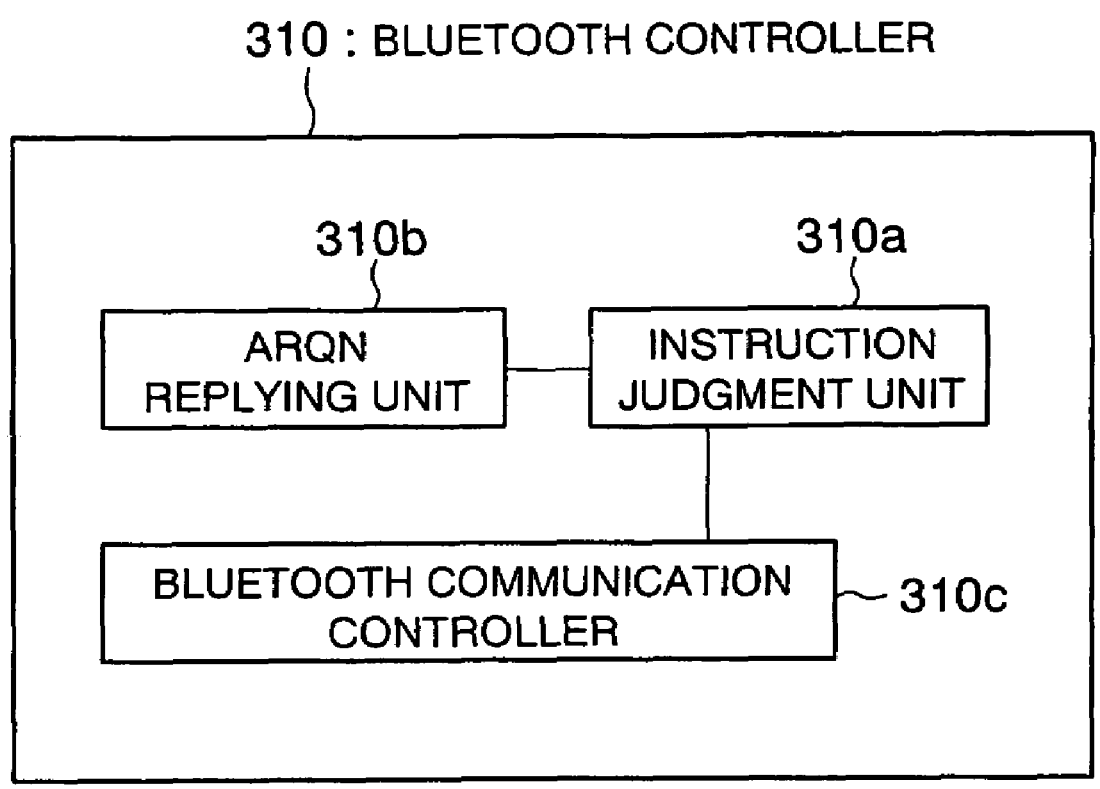
FIG. 15 is a block diagram explaining an example of an internal structure of a Bluetooth controller according to the third embodiment.

FIG. 15 is a block diagram explaining an example of an internal structure of the Bluetooth controller 310, and corresponding to FIG. 5 mentioned above. As shown in FIG. 15, the Bluetooth controller 310 includes an instruction judgment unit 310a, an ARQN replying unit 310b and a Bluetooth communication controller 310c.

The instruction judgment unit 310a judges whether the instructions from the CPU 46 instruct the Bluetooth controller 310 to reply ARQN=0 at the given ratio or to execute the normal Bluetooth communication. The ARQN replying unit 310b executes the communication processing that ARQN=0 is replied in the given ratio in accordance with the instructions from the instruction judgment unit 310a. On the other hand, the Bluetooth communication controller 310c executes the normal Bluetooth communication processing in accordance with the instructions from the instruction judgment unit 310a.

Figure 16:
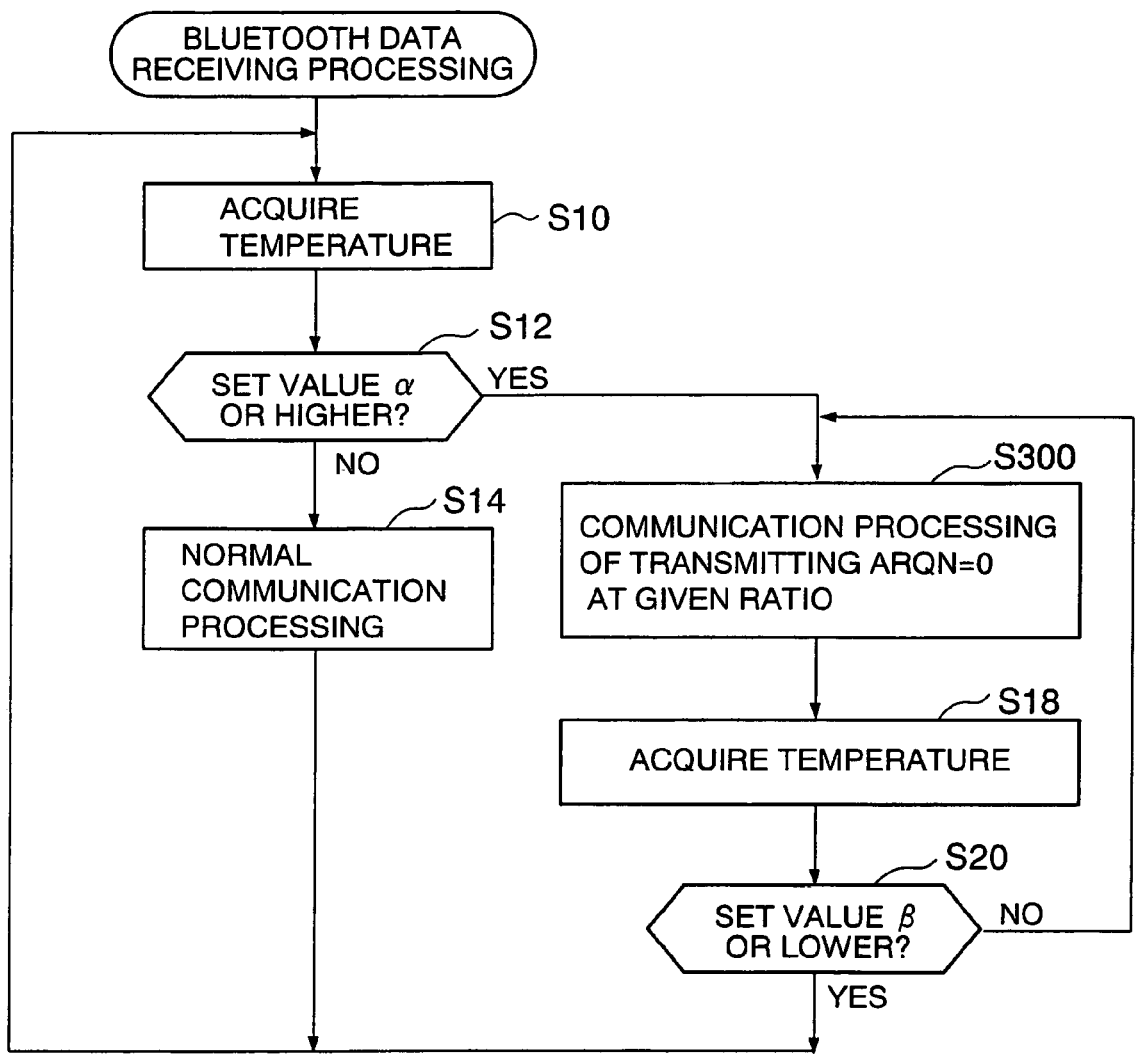
FIG. 16 is a flowchart explaining the contents of Bluetooth data receiving processing according to the third embodiment.

FIG. 16 is a flowchart explaining the contents of Bluetooth data receiving processing according to this embodiment, and corresponds to FIG. 3 described above. As can be seen from FIG. 16, in this embodiment, step S300 is performed instead of step S16. Namely, when the temperature of the hard disk drive 42 is the set value α or higher (step S12: YES), the storage device 20 performs communication processing of transmitting ARQN=0 which indicates that data has not been properly received at a given ratio (step S300). Namely, even when data has been properly received when being received from the computer 10 as the host, the storage device 20 transmits a packet containing ARQN=0 in its header to the computer 10 at the given ratio. As in the aforementioned first embodiment, the processing of transmitting the packet containing ARQN=0 in its header at the given ratio is autonomously performed by the ARQN replying unit 310b of the Bluetooth communication controller 310 based on instructions from the CPU 46. Then, when the temperature of the hard disk drive 42 reaches the set value β or lower, the CPU 46 instructs the Bluetooth communication controller 310 to stop the processing of transmitting ARQN=0 at the given ratio and return to the normal processing (step S20). That is, in the Bluetooth controller 310 which has received the instructions, the Bluetooth communication unit 310c executes the normal Bluetooth communication processing.

As described above, also according to the information processing system of this embodiment, when the temperature of the hard disk drive 42 of the storage device 20 reaches the set value α or higher, the number of accesses to the hard disk drive 42 from the computer 10 can be reduced or reduced to zero. Consequently, the temperature of the hard disk drive 42 can be decreased.

Fourth Embodiment

In the fourth embodiment, the present invention is applied to a TCP (Transmission Control Protocol).

Figure 17:
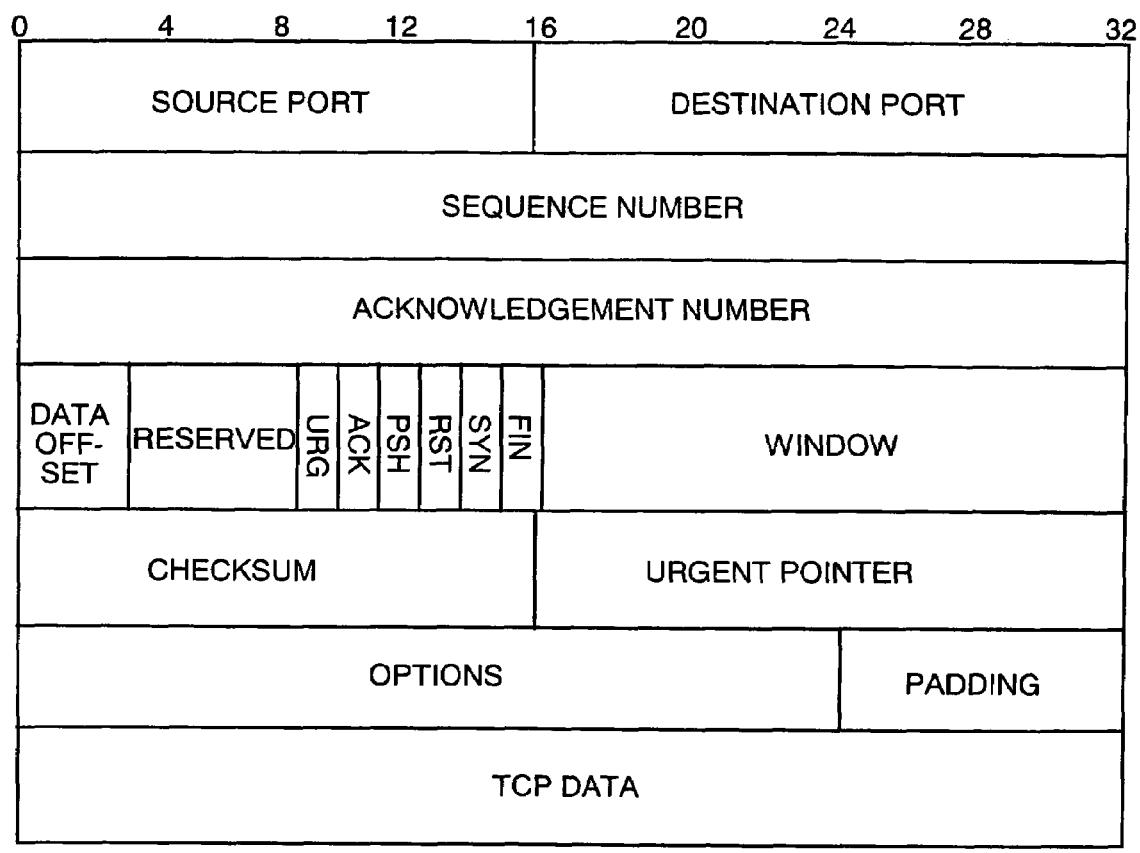
FIG. 17 is a diagram showing a segment format used in a TCP standard in a fourth embodiment.

In the TCP, every transmitted data is acknowledged by an acknowledgement within a given period of time. Namely, when a data segment is sent out from the transmitting end, a timer starts, and the transmitting end needs to receive the acknowledgement before the timer ends. When the acknowledgement cannot be received before the timer ends, the transmitting end judges that the data has been lost and retransmits the data segment. The acknowledgement is made by setting an ACK flag in a TCP segment header format shown in FIG. 17. When the acknowledgement cannot be received even if retransmission is repeated a predetermined number of times, the transmitting end transmits a segment with an RST flag set to forcibly end a connection.

Figure 18:
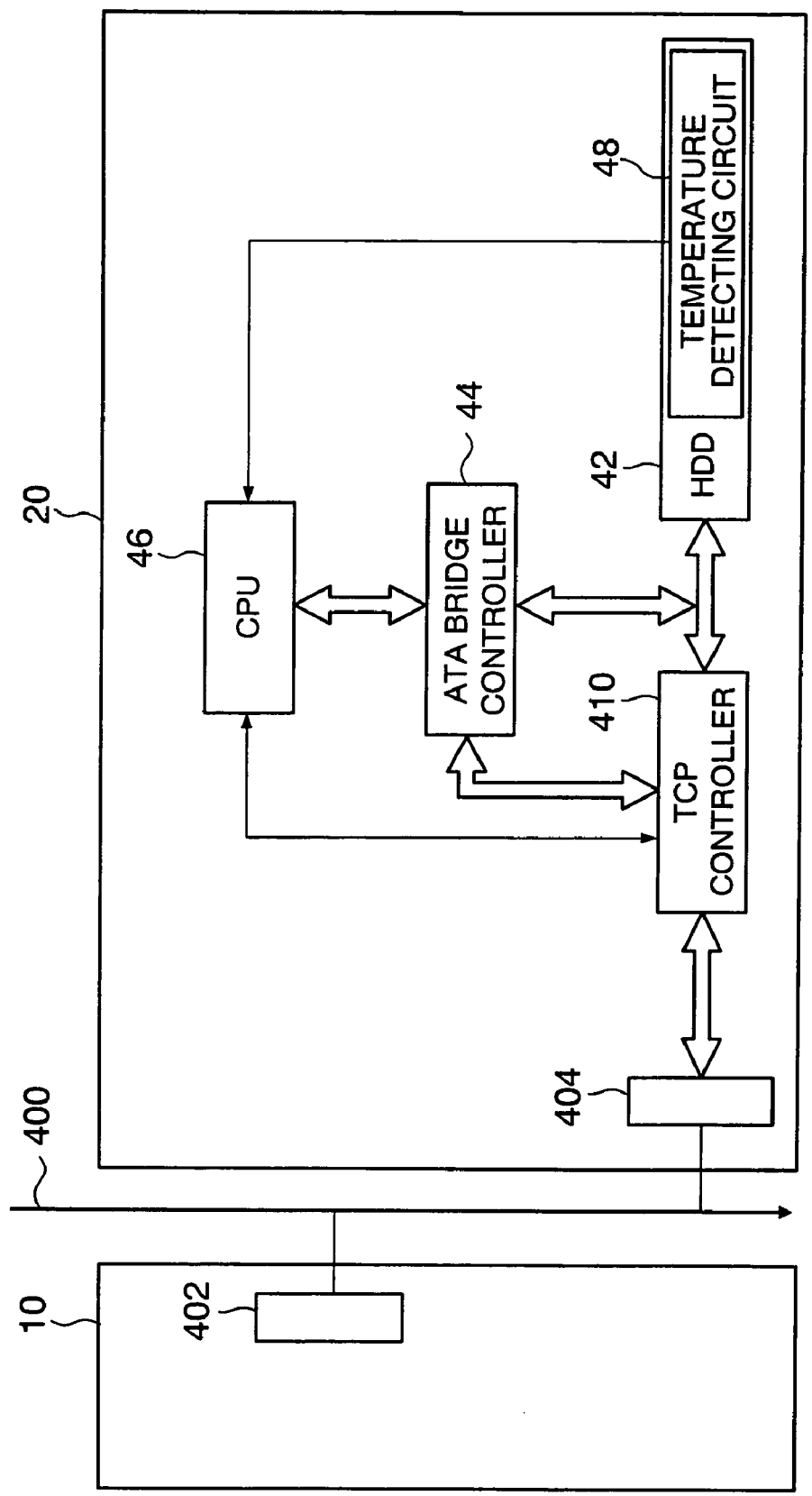
FIG. 18 is a block diagram showing the configuration of an information processing system according to the fourth embodiment.

FIG. 18 is a block diagram showing the configuration of an information processing system according to this embodiment, and corresponds to FIG. 1 described above. FIG. 18 is different from FIG. 1 in that the computer 10 and the storage device 20 are connected based on the TCP standard via a network 400. Therefore, the computer 10 includes a TCP standard interface 402, and the storage device 20 includes a TCP standard interface 404. In addition, the storage device 20 has a TCP controller 410 instead of the USB device controller 40.

Figure 19:
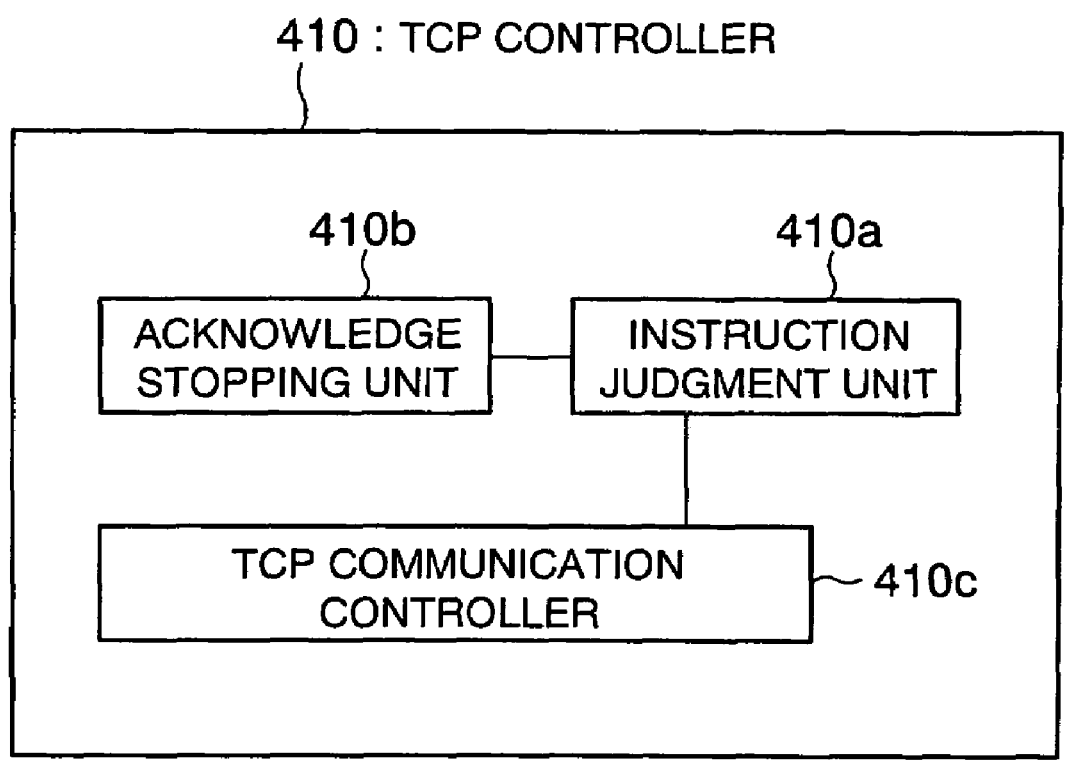
FIG. 19 is a block diagram explaining an example of an internal structure of a TCP controller according to the fourth embodiment.

FIG. 19 is a block diagram explaining an example of an internal structure of the TCP controller 410, and corresponding to FIG. 5 mentioned above. As shown in FIG. 19, the TCP controller 410 includes an instruction judgment unit 410a, an acknowledge stopping unit 410b and a TCP communication controller 410c.

The instruction judgment unit 410a judges whether the instructions from the CPU 46 instruct the TCP controller 410 not to reply the acknowledgement at the given ratio or to execute the normal TCP communication. The acknowledge stopping unit 410b executes the communication processing that the acknowledgement is not replied in the given ratio in accordance with the instructions from the instruction judgment unit 410a. On the other hand, the TCP communication controller 410c executes the normal TCP communication processing in accordance with the instructions from the instruction judgment unit 410a.

Figure 20:
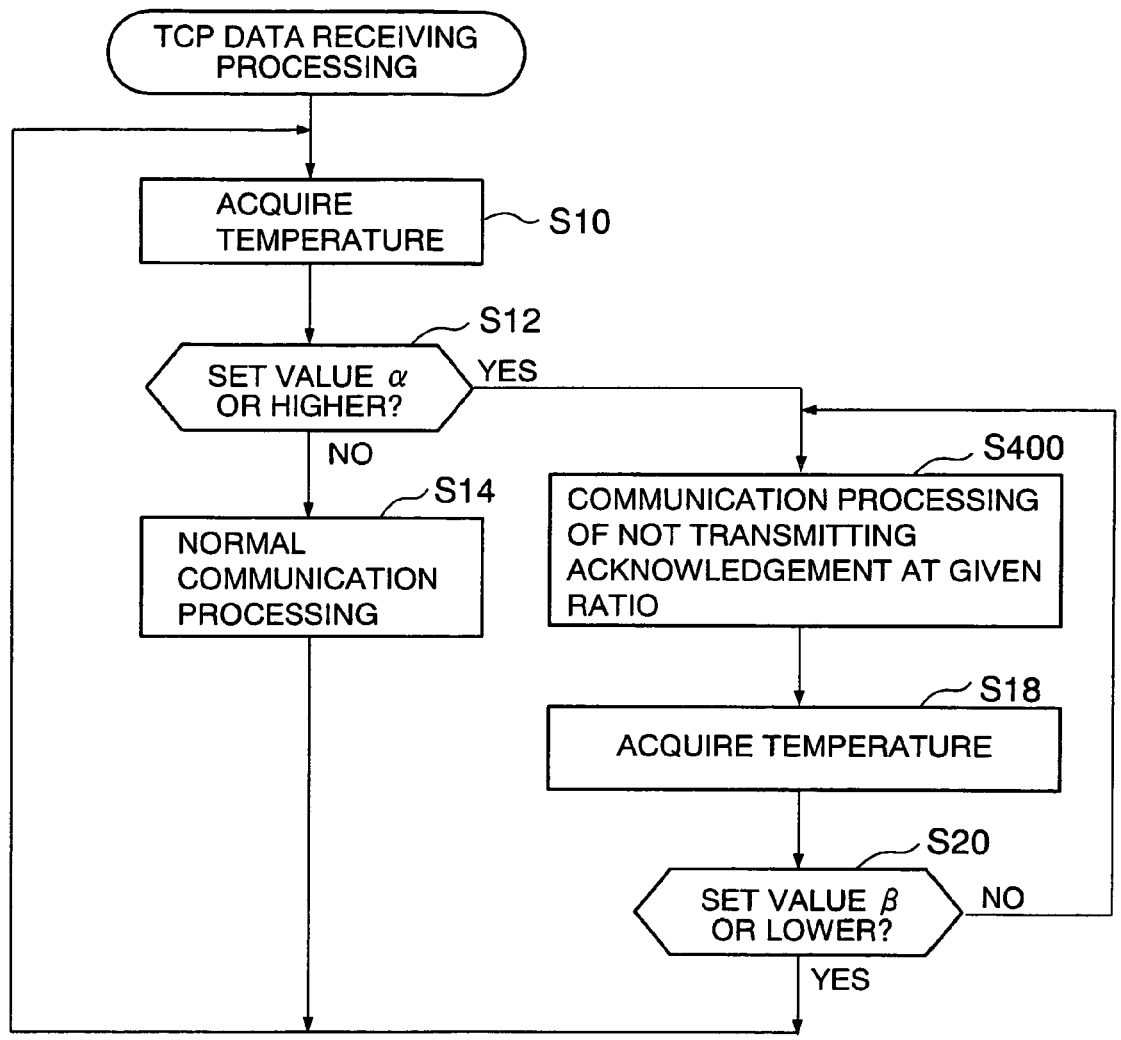
FIG. 20 is a flowchart explaining the contents of TCP data receiving processing according to the fourth embodiment.

FIG. 20 is a flowchart explaining the contents of TCP data receiving processing according to this embodiment, and corresponds to FIG. 3 described above. As can be seen from FIG. 20, in this embodiment, step S400 is performed instead of step S16. Namely, when the temperature of the hard disk drive 42 is the set value α or higher (step S12: YES), the storage device 20 performs communication processing of not transmitting the acknowledgement at a given ratio (step S400). Namely, even when data has been properly received when being received from the computer 10 as the host, the storage device 20 abandons the received data without transmitting the acknowledgement at the given ratio. As in the aforementioned first embodiment, the processing of not transmitting the acknowledgement at the given ratio is autonomously performed by the acknowledge stopping unit 410b of the TCP communication controller 410 based on instructions from the CPU 46. The computer 10 which cannot receive the acknowledgement after a predetermined period of time retransmits the data. Then, when the temperature of the hard disk drive 42 reaches the set value β or lower, the CPU 46 instructs the TCP controller 410 to stop the processing of not transmitting the acknowledgement at the given ratio and return to the normal processing (step S20). In the TCP controller 410 which received the instructions, the TCP communication controller 410c executes the normal TCP communication processing.

As described above, also according to the information processing system of this embodiment, when the temperature of the hard disk drive 42 of the storage device 20 reaches the set value α or higher, the number of accesses to the hard disk drive 42 from the computer 10 can be reduced or reduced to zero. Consequently, the temperature of the hard disk drive 42 can be decreased.

Fifth Embodiment

In the first embodiment mentioned above, there is a possibility that the USB communication is disconnected because of a timeout if the "NAK" replying ratio is high in the heat release mode. When the USB communication has been disconnected, the user has to retry to establish a connection. Specifically, the user has to unplug and plug in a USB connector so as to establish the connection again.

However, the time until the timeout varies according to kinds of OS used in the computer 10 and the storage device 20 or kinds of communication driver used therein, so that it is difficult to predetermine a proper given ratio.

Therefore, the USB device controller 40 is equipped with a learning function in this embodiment. If the connection is disconnected in the heat release mode to transmit "NAK" at a certain ratio, then the "NAK" replying ratio for the next time is decreased beforehand, so that it is possible to avoid disconnecting the connection. Only portions different from those in the first embodiment will be described hereinafter.

Figure 21:
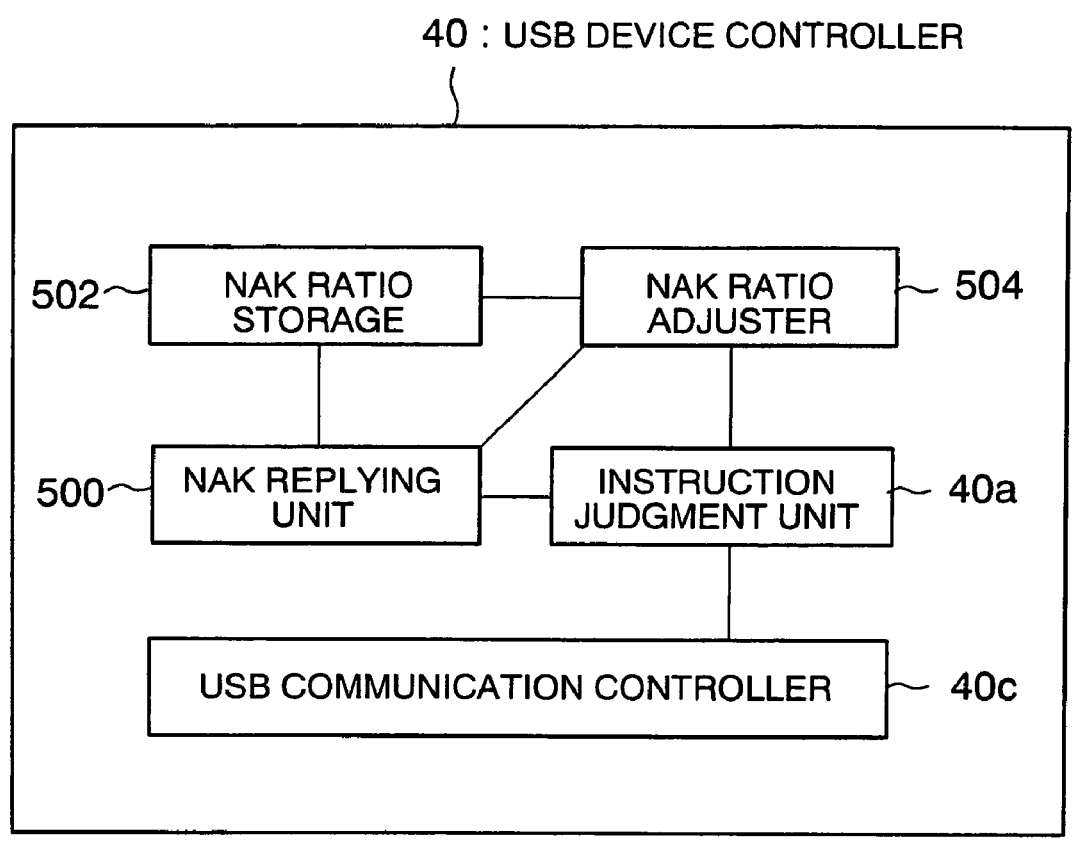
FIG. 21 is a block diagram explaining an example of an internal structure of a USB device controller according to a fifth embodiment.

FIG. 21 is a block diagram explaining an example of an internal structure of the USB device controller 40 according to this embodiment, and corresponding to FIG. 5 mentioned above. As shown in FIG. 21, the USB device controller 40 includes the instruction judgment unit 40a, the USB communication controller 40c, a NAK replying unit 500, a NAK ratio storage 502 and a NAK ratio adjuster 504.

Functions of the instruction judgment unit 40a and the USB communication controller 40c are the same as those of the first embodiment mentioned above. The NAK replying unit 500 obtains a NAK ratio stored in the NAK ratio storage 502 and transmits the "NAK" to the computer 10 at a ratio defined by the obtained NAK ratio in the heat release mode even when the data has been properly received. The NAK ratio adjuster 504 monitors whether the timeout occurs in the heat release mode, and the NAK ratio adjuster 504 decreases the NAK ratio and stores it in the NAK ratio storage 502 if the timeout occurs.

Incidentally, the processing is carried out in the hardware in this embodiment, however, if the USB device controller 40 is equipped with a microprocessor, this processing can be carried out in the software.

Figure 22:
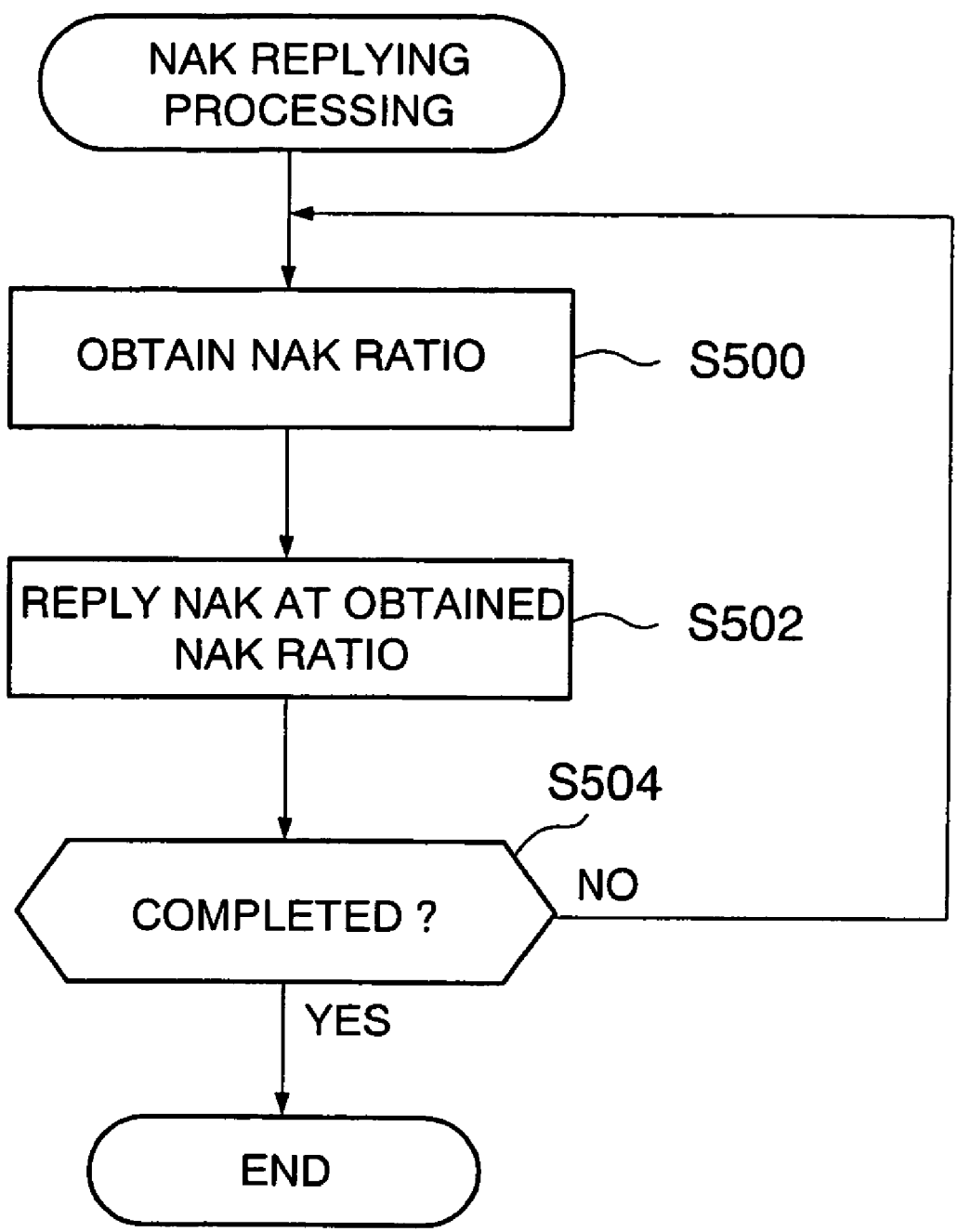
FIG. 22 is a flowchart explaining the contents of NAK replying processing which is executed in the USB device controller according to the fifth embodiment.

FIG. 22 is a flowchart explaining NAK replying processing which is executed in the NAK replying unit 500. This NAK replying processing is activated when the instruction judgment unit 40a instructs the NAK replying unit 500 to transmit the "NAK" at the given ratio.

First, in this NAK replying processing, the NAK replying unit 500 obtains the NAK ratio stored in the NAK ratio storage 502 (step S500). For example, the value of 90% of the NAK ratio is stored in the NAK ratio storage 502 for an initial value.

Next, the NAK replying unit 500 performs processing to transmit "NAK" at the ratio defined by the obtained NAK ratio (step S502). That is, the NAK replying unit 500 transmits the "NAK" reply at the ratio defined by the NAK ratio in response to the data and the taken packet transmitted from the computer 10 even when they have been properly received or they can be properly processed.

Next, the NAK replying unit 500 judges whether the instruction judgment unit 40a has instructed the NAK replying unit 500 to end the processing to transmit "NAK" at the given ratio (step S504). When the instruction judgment unit 40a has not instructed the NAK replying unit 500 to end the processing to transmit "NAK" at the given ratio (step S504: NO), the processing in step S502 is repeated.

On the other hand, when the instruction judgment unit 40a has instructed the NAK replying unit 500 to end the processing to transmit the "NAK" at the given ratio (step S504: YES), the NAK replying processing is completed and it returns to the normal mode.

Figure 23:
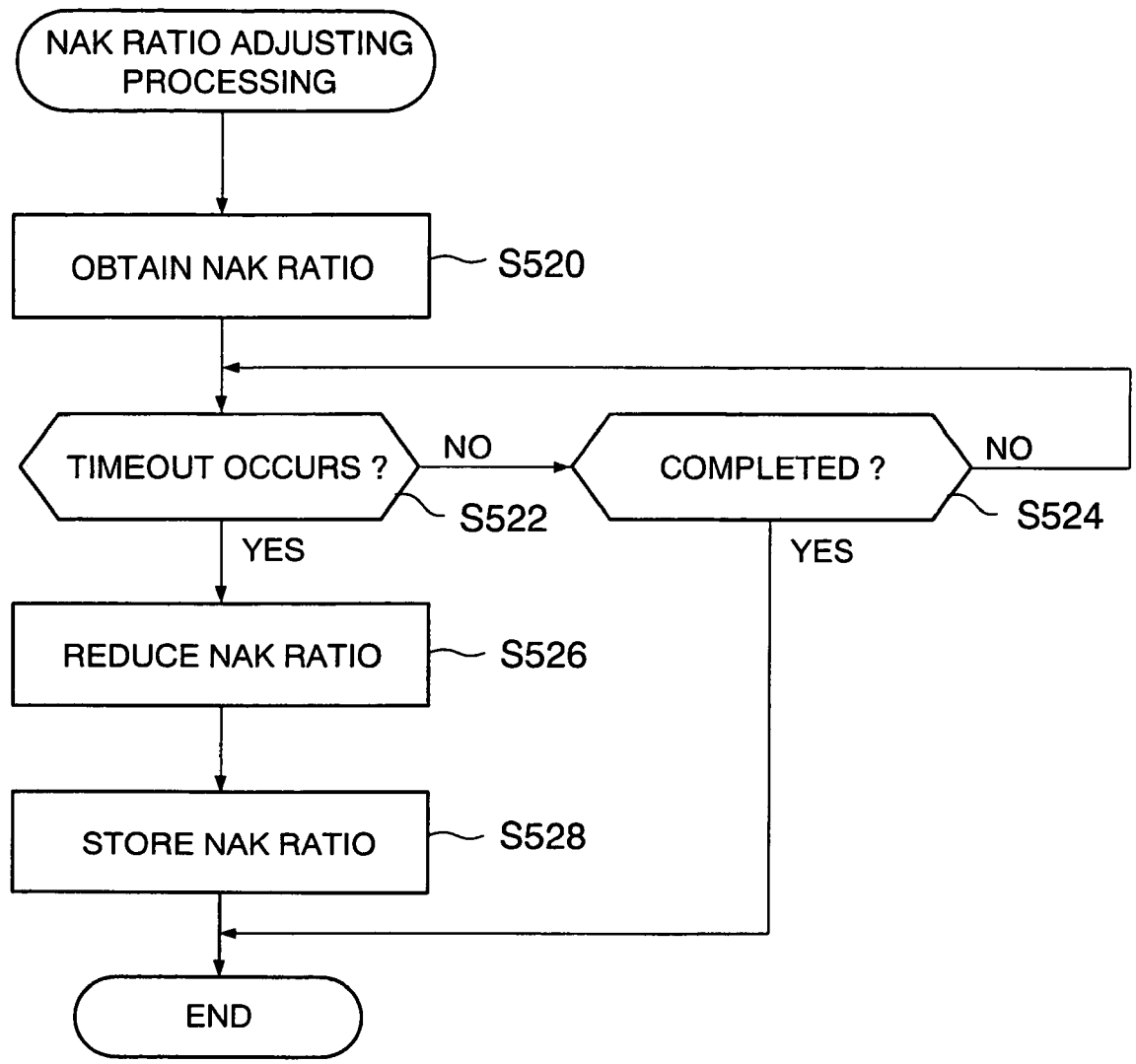
FIG. 23 is a flowchart explaining the contents of NAK ratio adjusting processing which is executed in the USB device controller according to the fifth embodiment.

FIG. 23 is a flowchart explaining NAK ratio adjusting processing which is executed in the NAK adjuster 504. This NAK ratio adjusting processing is activated when the NAK ratio adjuster 504 receives from the instruction judgment unit 40a the notice that it shifts to the heat release mode for transmitting the "NAK" reply at the given ratio.

First, in this NAK ratio adjusting processing, the NAK ratio adjuster 504 obtains the NAK ratio from the NAK ratio storage 502 (step S520).

Next, the NAK ratio adjuster 504 judges whether the timeout has occurred (step S522). There are various ways for judging whether the timeout has occurred. For example, in the IN transaction, since data is transmitted at the ratio of (100%—the NAK ratio), it is possible to judge that the timeout has occurred in the computer 10 and the connection has been disconnected when the acknowledgement thereof is not received even if a predetermined time (for example, 10 seconds) has passed. On the other hand, in the OUT transaction, since the acknowledgement for data transmitted from the computer 10 is transmitted at the ratio of (100%—the NAK ratio), it is possible to judge that the timeout has occurred in the computer 10 and the connection has been disconnected when the next data from the computer 10 is not received even if a predetermined time (for example, 10 seconds) is passed.

When the timeout has not occurred (step S522: NO), the NAK ratio adjuster 504 judges whether the NAK ratio adjuster 504 has received from the instruction judgment unit 40a the notice that the process to transmit the "NAK" at given ratio is completed (step S524). When the NAK ratio adjuster 504 has not received the notice that the processing to transmit "NAK" is completed (step S524: NO), the processing from step S522 is repeated. On the other hand, when the NAK ratio adjuster 504 has received the notice that the processing to transmit "NAK" is completed (step S524: YES), the NAK ratio adjusting processing is completed.

On the other hand, when it is judged in step S522 that the timeout has occurred (step S522: YES), the NAK ratio obtained in step S520 is reduced (step S526). In this embodiment, 5% is subtracted from the NAK ratio obtained in step S520 and this is regarded as the new NAK ratio.

Next, the NAK ratio adjuster 504 stores the reduced NAK ratio in the NAK ratio storage 502 (step S528). As a result, when the NAK replying processing is executed the next time, the processing to transmit the "NAK" reply is executed in accordance with the new reduced NAK ratio. And then, the NAK ratio adjusting processing is completed.

As stated above, according to the information processing system of this embodiment, when the timeout has occurred in computer 10 in the hear release mode, the ratio of replying the "NAK" is decreased for the next time. Therefore, it is possible to prevent the timeout from occurring by repeating the timeout.

Incidentally, the NAK ratio adjusting processing is executed in the USB device controller 40, but it may be executed in the CPU 46. In this case, when the CPU 46 transmits to the USB device controller 40 the instructions to transmit the "NAK" reply (step S16), the CPU needs to transmit the NAK ratio thereof to the USB device controller 40.

Sixth Embodiment

The NAK ratio is reduced by the predetermined ratio when the timeout has occurred in the heat release mode in the fifth embodiment mentioned above, whereas a new NAK ratio is decided in accordance with the time until the timeout occurs in this embodiment. Only portions different from those in the fifth embodiment will be described hereinafter.

Figure 24:
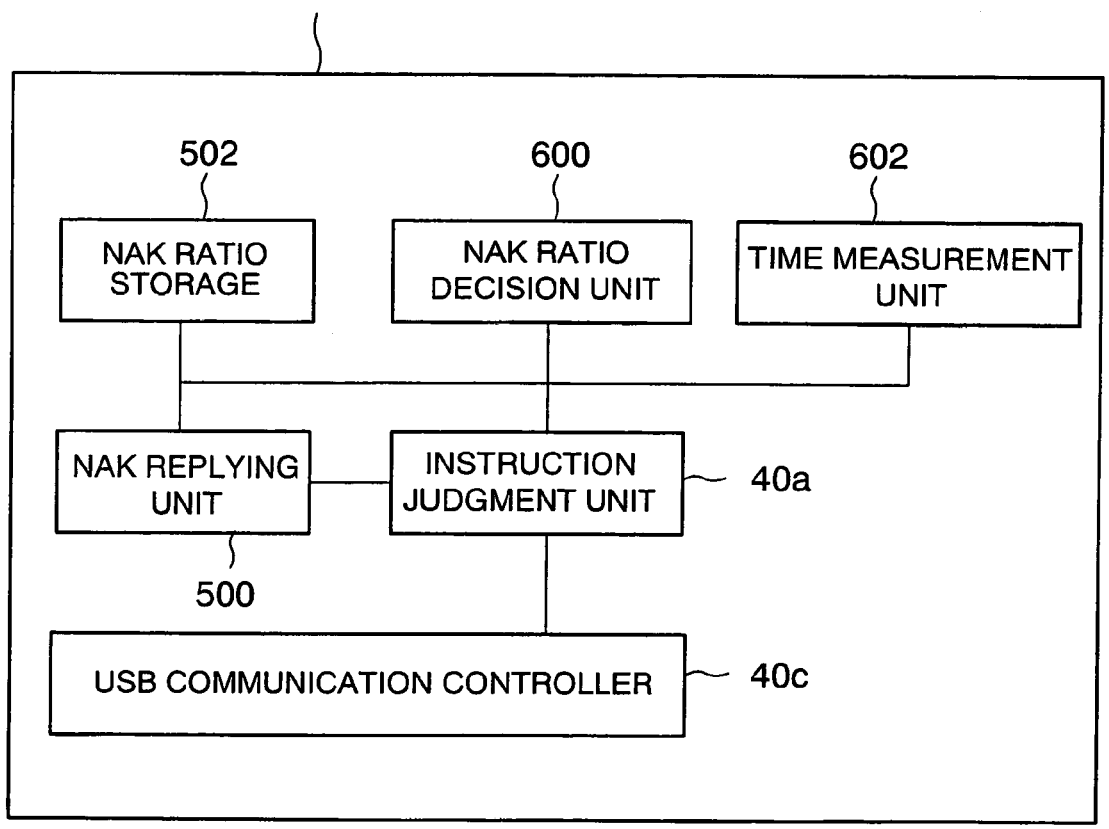
FIG. 24 is a block diagram explaining an example of an internal structure of a USB device controller according to a sixth embodiment.

FIG. 24 is a block diagram explaining an example of an internal structure of the USB device controller 40 according to this embodiment, and corresponding to FIG. 21 mentioned above. As shown in FIG. 24, the USB device controller 40 includes the instruction judgment unit 40a, the USB communication controller 40c, a NAK replying unit 500, a NAK ratio storage 502, a NAK ratio decision unit 600 and a time measurement unit 602.

Functions of the instruction judgment unit 40a, the USB communication controller 40c, the NAK replying unit 500 and the NAK storage 502 are the same as those of the fifth embodiment mentioned above. The NAK ratio decision unit 600 monitors whether the timeout occurs in the heat release mode, and if the timeout occurs, then the NAK ratio decision unit 600 decides a new NAK ratio in accordance with the time until the timeout occurs and stores it in the NAK ratio storage 502.

The timeout measurement unit 602 measures the time until the timeout occurs. Therefore, the NAK ratio decision unit 600 obtains the time until the timeout from the time measurement unit 602 when the timeout has occurred.

There are various ways for measuring the time until the timeout occurs. For example, when the "NAK" replies are continuously transmitted, the time measurement unit 602 may measure the continuous time and regards the continuous time as the time until the timeout occurs, or the time measurement unit 603 may measure the time between replying the last "ACK" and occurrence of the timeout.

Incidentally, the processing is implemented in the hardware in this embodiment, however, if the USB device controller 40 is equipped with a microprocessor, the processing can be implemented in the software.

Moreover, the NAK replying processing executed in the NAK replying unit 500 according to this embodiment is the same as that of the fifth embodiment mentioned above.

Figure 25:
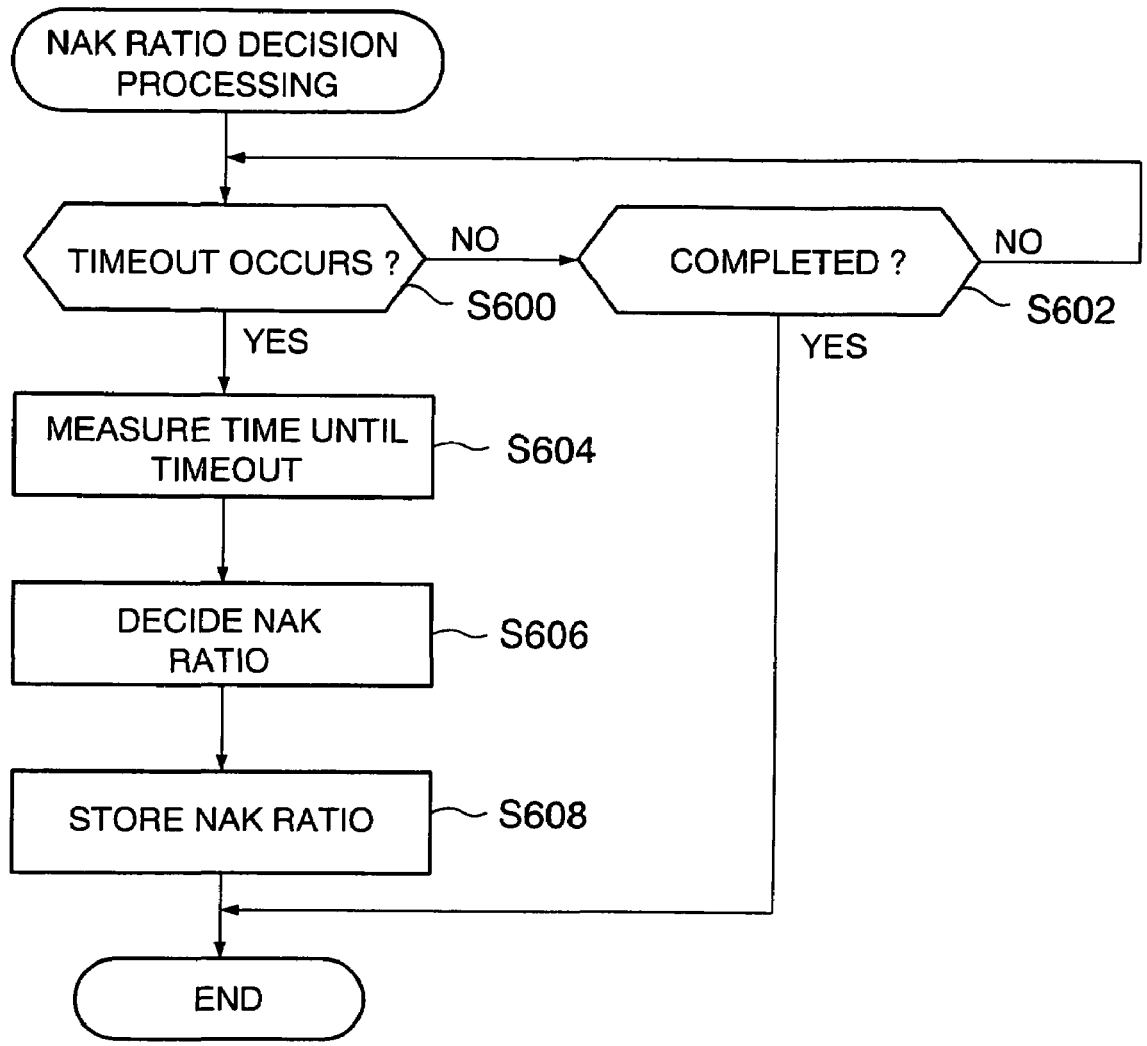
FIG. 25 is a flowchart explaining the contents of NAK ratio decision processing which is executed in the USB device controller according to the sixth embodiment.

FIG. 25 is a flowchart explaining NAK ratio decision processing which is executed in the NAK decision unit 600 according to this embodiment. This NAK ratio decision processing is activated when the NAK ratio decision unit 600 has received from the instruction judgment unit 40a the notice that it shifts to the heat release mode for transmitting the "NAK" reply at the given ratio.

First, in this NAK ratio decision processing, the NAK ratio decision unit 600 judges whether the timeout has occurred (step S600). The way to judge whether the timeout has occurred is the same as that of the fifth embodiment.

When the timeout has not occurred (step S600: NO), the NAK ratio decision unit 600 judges whether the NAK ratio decision unit 600 has received from the instruction judgment unit 40a the notice that the process to transmit the "NAK" at the given ratio is completed (step S602). When the NAK ratio decision unit 600 has not received the notice that the processing to transmit the "NAK" is completed (step S602: NO), the processing from step S600 is repeated. On the other hand, when the NAK ratio decision unit 600 has received the notice that the processing to transmit the "NAK" is completed (step S602: YES), the NAK ratio decision processing is completed.

On the other hand, when it is judged in step S600 that the timeout has occurred (step S600: YES), the NAK ratio decision unit 600 obtains from the time measurement unit 602 time until the timeout occurs (step S604).

Figure 26:
FIG. 26 is a diagram explaining an example of configuration of a NAK ratio table according to the sixth embodiment.

Next, the NAK ratio decision unit 600 decides a new NAK ratio in accordance with the obtained time until the timeout (step S606). FIG. 26 is a diagram showing an example of a NAK ratio table TB10 which is used in step S606. In this embodiment, the NAK ratio table TB10 is stored in a ROM provided in the NAK ratio decision unit 600. Times until the timeout and NAK ratios corresponding thereto are stored in the NAK ratio table TB10. Therefore, in step S606, the NAK ratio decision unit 600 retrieves a new NAK ratio corresponding to the time until the timeout from the NAK ratio table TB10 in accordance with the time until the timeout occurs.

It is possible to roughly estimate the proper NAK ratio corresponding to the time until the timeout based on the communication protocol. Therefore, in this embodiment, the NAK ratios are defined based on the estimated cases.

Next, as shown in FIG. 25, the NAK ratio decision unit 600 stores the new NAK ratio in the NAK ratio storage 502 (step S608). As a result, when the NAK replying processing is executed the next time, the processing to transmit the "NAK" is executed in accordance with the new NAK ratio. And then, the NAK ratio decision processing is completed.

As stated above, according to the information processing system of this embodiment, when the timeout has occurred in computer 10 in the hear release mode, the next ratio of transmitting the "NAK" is decided based on the time until the timeout occurs. Therefore, it is possible to significantly reduce the possibility that the timeout occurs the next time.

Incidentally, the NAK ratio decision processing is executed in the USB device controller 40, but it may be executed in the CPU 46. In this case, when the CPU 46 transmits to the USB device controller 40 the instructions to transmit the "NAK" (step S16), the CPU needs to transmit the NAK ratio thereof to the USB device controller 40.

It should be mentioned that the present invention is not limited to the aforementioned embodiments, and various changes may be made therein. For example, in the aforementioned embodiments, the hard dirk drive 42 is explained as an example of a heat-producing internal unit which produces heat by operating continuously, but this heat-producing internal unit is not limited to the hard disk drive 42. For example, the present invention is also applicable to an information device including a spindle-type internal unit such as a CD-R/RW drive, a DVD-R/RW drive, a flexible disk drive or an optical disk drive as the heat-producing internal unit. The present invention is also applicable to an information device including a heat-producing electronic circuit such as a CPU as the heat-producing internal unit.

Moreover, the storage device 20 is an example of an information device including a heat-producing internal unit, and a personal computer, a PDA (Personal Digital Assistant), and so on are also available.

Further, the "given ratio" in the aforementioned first embodiment through fourth embodiment (step S16, for example) can be set arbitrarily within a range from 0% to not more than 100%. It is noted, however, that if the given ratio is set at 100% when there is a limit to the number of retrials of data transmission on the computer 10 side or when there is a limit to time-out, there is a possibility of corresponding to an error thereof. In this case, by setting the given ratio at 50% or 70%, the possibility of corresponding to the error can be reduced. Furthermore, the given ratio may be changed dynamically according to the temperature of the hard disk drive 42 and the like.

In addition, in the aforementioned embodiments, control for transmitting a reply that data has not been properly received at the given ratio is executed in the USB device controller 40, the IEEE1394 controller 210, the Bluetooth controller 310 or the TCP controller 410, but the control for transmitting the reply may be executed in the CPU 46. Moreover, a part of the control for transmitting a reply that data has not been properly received at the given ratio may be executed in the CPU 46. In this case, for example, in FIG. 24, the processing executed in at least one of the instruction judgment unit 40a, the USB communication controller 40c, the NAK replying unit 500, the NAK ratio storage 502, the NAK ratio decision unit 600 and the time measurement unit 602 may be executed in the CPU 46.

Moreover, in the fifth embodiment and the sixth embodiment, the USB communication is used for explaining the way to adjust or change the NAK ratio when the timeout has occurred, but the way can applied to other communication standards.

Besides, as for each processing explained in the aforementioned embodiments, it is possible to record a program to execute each processing on a recording medium such as a flexible disk, a CD-ROM (Compact Disc-Read Only Memory), a ROM, a memory card, or the like and distribute this program in the form of the recording medium. In this case, the aforementioned embodiments can be realized by making the information device such as the storage device 20 read the recording medium on which this program is recorded and execute this program.

Additionally, the information device such as the storage device 20 sometimes has other programs such as an operating system, other application programs, and the like. In this case, by using these other programs in the information device, a command, which calls a program to realize processing equal to that in the aforementioned embodiments out of programs in the information device, may be recorded on the recording medium.

Moreover, such a program can be distributed not in the form of the recording medium but in the form of a carrier wave via a network. The program transmitted in the form of the carrier wave over the network is incorporated in the information device such as the storage device 20, and the aforementioned embodiments can be realized by executing this program.

Further, when being recorded on the recording medium or transmitted as the carrier wave over the network, the program is sometimes encrypted or compressed. In this case, the information device such as the storage device 20 which has read the program from the recording medium or the carrier wave needs to execute the program after decrypting or expanding the program.

What is claimed is:

1. An information device, comprising:
    a communicator which communicates with a host, wherein, in a normal mode, the communicator transmits a reply that data has been properly received to the host when the data has been properly received and transmits a reply that the data has not been properly received to the host when the data has not been properly received, and wherein, in a heat release mode, the communicator transmits the reply that the data has not been properly received to the host at a given ratio even when the communicator should transmit the reply that the data has been properly received in the normal mode since the data has been properly received;
    a heat-producing internal unit which operates according to the data received by the communicator, the heat-producing unit producing heat by operating continuously;
    a temperature detector which detects a temperature of the internal unit;
    a first mode changer which changes the communicator from the normal mode to the heat release mode when the temperature detected by the temperature detector is a first set value or higher; and
    a ratio adjuster which, when a timeout occurs in the communication with the host in the heat release mode, reduces the given ratio.

2. The information device according to claim 1, further comprising a second mode changer which changes the communicator from the heat release mode to the normal mode when the temperature detected by the temperature detector is a second set value or lower in the heat release mode.

3. The information device according to claim 2, wherein the first set value is lower than an upper limit of a usable temperature of the internal unit, and
    the second set value is lower than the first set value.

4. The information device according to claim 1, wherein the given ratio in the heat release mode is 100%.

5. The information device according to claim 1, wherein the reply that the data has not been properly received is a negative acknowledgement.

6. The information device according to claim 1, wherein when the timeout occurs in the communication with the host in the heat release mode, the ratio adjuster decides the given ratio in accordance with a timeout period.

7. The information device according to claim 1, wherein the communication between the information device and the host is in compliance with a communication standard specification in which the information device is not allowed to autonomously transmit a request to stop data transmission to the host.

8. A controlling method of an information device which operates according to received data and which includes a heat-producing internal unit producing heat by operating continuously, the controlling method comprising the steps of:
    in a communication with a host, transmitting a reply that data has been properly received to the host when the data has been properly received in a normal mode and transmitting a reply that the data has not been properly received to the host when the data has not been properly received in the normal mode;
    in the communication with the host, transmitting the reply that the data has not been properly received to the host at a given ratio even when the communicator should transmit the reply that the data has been properly received in the normal mode since the data has been properly received in a heat release mode;
    detecting a temperature of the internal unit;
    changing a communication mode from the normal mode to the heat release mode when the detected temperature is a first set value or higher; and
    reducing the given ratio when a timeout occurs in the communication with the host in the heat release mode.

9. The controlling method according to claim 8, further comprising a step of changing the communication mode from the heat release mode to the normal mode when the temperature of the internal unit is a second set value or lower in the heat release mode.

10. The controlling method according to claim 9, wherein the first set value is lower than an upper limit of a usable temperature of the internal unit, and
the second set value is lower than the first set value.

11. The controlling method according to claim 8, wherein the given ratio in the heat release mode is 100%.

12. The controlling method according to claim 8, wherein the reply that the data has not been properly received is a negative acknowledgement.

13. The controlling method according to claim 8, wherein when the timeout occurs in the communication with the host in the heat release mode, the given ratio is decided in accordance with a timeout period.

14. The controlling method according to claim 8, wherein the communication between the information device and the host is in compliance with a communication standard specification in which the information device is not allowed to autonomously transmit a request to stop data transmission to the host.

15. A recording medium, having a program for controlling an information device which operates according to received data and which includes a heat-producing internal unit producing heat by operating continuously recorded thereon, wherein the program causes the information device to execute process comprising the steps of:
in a communication with a host, transmitting a reply that data has been properly received to the host when the data has been properly received in a normal mode and transmitting a reply that the data has not been properly received to the host when the data has not been properly received in the normal mode;
in the communication with the host, transmitting the reply that the data has not been properly received to the host at a given ratio even when the communicator should transmit the reply that the data has been properly received in the normal mode since the data has been properly received in a heat release mode;
detecting a temperature of the internal unit;
changing a communication mode from the normal mode to the heat release mode when the detected temperature is a first set value or higher; and
reducing the given ratio when a timeout occurs in the communication with the host in the heat release mode.

16. An information device, comprising:
a communicator which communicates with a host, wherein, in a normal mode, the communicator transmits a reply that data has been properly received to the host when the data has been properly received and does not transmit the reply that the data has been properly received to the host when the data has not been properly received, and wherein, in a heat release mode, the communicator does not transmit the reply that the data has been properly received to the host at a given ratio even when the communicator should transmit the reply that the data has been properly received in the normal mode since the data has been properly received;
a heat-producing internal unit which operates according to the data received by the communicator, the heat-producing unit producing heat by operating continuously;
a temperature detector which detects a temperature of the internal unit;
a first mode changer which changes the communicator from the normal mode to the heat release mode when the temperature detected by the temperature detector is a first set value or higher; and
a ratio adjuster which, when a timeout occurs in the communication with the host in the heat release mode, reduces the given ratio.

17. A controlling method of an information device which operates according to received data and which includes a heat-producing internal unit producing heat by operating continuously, comprising the steps of:
in a communication with a host, transmitting a reply that data has been properly received to the host when the data has been properly received in a normal mode and not transmitting the reply that the data has been properly received to the host when the data has not been properly received in the normal mode;
in the communication with the host, not transmitting the reply that the data has been properly received to the host at a given ratio even when the communicator should transmit the reply that the data has been properly received in the normal mode since the data has been properly received in a heat release mode;
detecting a temperature of the internal unit;
changing a communication mode from the normal mode to the heat release mode when the detected temperature is a first set value or higher; and
reducing the given ratio when a timeout occurs in the communication with the host in the heat release mode.

18. A recording medium, having a program for controlling an information device which operates according to received data and which includes a heat-producing internal unit producing heat by operating continuously recorded thereon, wherein the program causes the information device to execute process comprising the steps of:
in a communication with a host, transmitting a reply that data has been properly received to the host when the data has been properly received in a normal mode and not transmitting the reply that the data has been properly received to the host when the data has not been properly received in the normal mode;
in the communication with the host, not transmitting the reply that the data has been properly received to the host at a given ratio even when the communicator should transmit the reply that the data has been properly received in the normal mode since the data has been properly received in a heat release mode;
detecting a temperature of the internal unit;
changing a communication mode from the normal mode to the heat release mode when the detected temperature is a first set value or higher; and
reducing the given ratio when a timeout occurs in the communication with the host in the heat release mode.

* * * * *